(12) United States Patent
Connor

(10) Patent No.: US 11,502,838 B2
(45) Date of Patent: Nov. 15, 2022

(54) METHODS AND SYSTEMS FOR TRACKING AND RECOVERING ASSETS STOLEN ON DISTRIBUTED LEDGER-BASED NETWORKS

(71) Applicant: EYGS LLP, London (GB)

(72) Inventor: Michael Laurence Connor, London (GB)

(*) Notice: Subject to any disclaimer, the term of this patent is extended or adjusted under 35 U.S.C. 154(b) by 94 days.

(21) Appl. No.: 16/848,296

(22) Filed: Apr. 14, 2020

(65) Prior Publication Data

US 2020/0328890 A1  Oct. 15, 2020

Related U.S. Application Data

(60) Provisional application No. 62/834,352, filed on Apr. 15, 2019.

(51) Int. Cl.
*H04L 9/32* (2006.01)
*G06F 16/27* (2019.01)
*G06Q 10/10* (2012.01)
*G06Q 20/12* (2012.01)
*G06Q 50/26* (2012.01)
*H04L 9/06* (2006.01)
*H04L 9/30* (2006.01)

(52) U.S. Cl.
CPC ............ *H04L 9/3213* (2013.01); *G06F 16/27* (2019.01); *G06Q 10/10* (2013.01); *G06Q 20/1235* (2013.01); *G06Q 50/265* (2013.01); *H04L 9/0643* (2013.01); *H04L 9/30* (2013.01); *H04L 9/3221* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 9,397,985 | B1 | 7/2016 | Seger, II et al. |
| 9,608,829 | B2 | 3/2017 | Spanos et al. |
| 9,785,369 | B1 | 10/2017 | Ateniese et al. |
| 9,794,074 | B2 | 10/2017 | Toll et al. |

(Continued)

FOREIGN PATENT DOCUMENTS

| | | |
|---|---|---|
| CN | 107274184 A | 10/2017 |
| CN | 106598824 B | 11/2018 |

(Continued)

OTHER PUBLICATIONS

International Search Report and Written Opinion for International Application No. PCT/EP2020/060629, dated Jun. 25, 2020, 9 pages.

(Continued)

*Primary Examiner* — William J. Goodchild
(74) *Attorney, Agent, or Firm* — Cooley LLP

(57) ABSTRACT

The instant disclosure illustrates how the privacy and security of activities occurring on distributed ledger-based networks (DLNs) can be enhanced with the use of zero-knowledge proofs (ZKPs) that can be used to verify the validity of at least some aspects of the activities without private information related to the activities necessarily being revealed publicly. Methods and systems that are directed at facilitating the tracking and recovery of assets stolen on ZKP-enabled DLNs while preserving the confidentiality of the tokens are presented herein.

20 Claims, 3 Drawing Sheets

(56) References Cited

U.S. PATENT DOCUMENTS

| | | |
|---|---|---|
| 9,870,508 B1 | 1/2018 | Hodgson et al. |
| 9,881,176 B2 | 1/2018 | Goldfarb et al. |
| 9,906,513 B2 | 2/2018 | Wuehler |
| 9,942,231 B1 | 4/2018 | Laucius et al. |
| 9,948,467 B2 | 4/2018 | King |
| 9,959,065 B2 | 5/2018 | Ateniese et al. |
| 10,026,118 B2 | 7/2018 | Castinado et al. |
| 10,721,069 B2 | 7/2020 | Konda et al. |
| 10,825,295 B2 | 11/2020 | Simons |
| 10,833,861 B2 | 11/2020 | Chari et al. |
| 10,951,409 B2 | 3/2021 | Konda et al. |
| 11,146,399 B2 | 10/2021 | Westland et al. |
| 11,188,977 B2 | 11/2021 | Youb et al. |
| 2016/0260169 A1 | 9/2016 | Arnold et al. |
| 2016/0358165 A1 | 12/2016 | Maxwell |
| 2017/0091750 A1 | 3/2017 | Maim |
| 2017/0161829 A1 | 6/2017 | Mazier |
| 2017/0163733 A1 | 6/2017 | Grefen et al. |
| 2017/0278100 A1 | 9/2017 | Kraemer et al. |
| 2017/0293503 A1 | 10/2017 | Curtis |
| 2017/0346639 A1 | 11/2017 | Muftic |
| 2018/0048461 A1 | 2/2018 | Jutla et al. |
| 2018/0077122 A1 | 3/2018 | Hoss et al. |
| 2018/0101701 A1 | 4/2018 | Barinov et al. |
| 2018/0137465 A1 | 5/2018 | Batra et al. |
| 2018/0139043 A1 | 5/2018 | Jayachandran et al. |
| 2018/0158036 A1* | 6/2018 | Zhou .................. G06Q 20/401 |
| 2018/0165131 A1 | 6/2018 | O'Hare et al. |
| 2018/0189753 A1 | 7/2018 | Konda et al. |
| 2018/0191503 A1 | 7/2018 | Alwar et al. |
| 2018/0218176 A1 | 8/2018 | Voorhees et al. |
| 2018/0285217 A1 | 10/2018 | Smith et al. |
| 2018/0294967 A1 | 10/2018 | Roberts et al. |
| 2018/0343114 A1 | 11/2018 | Ben-Ari |
| 2019/0012660 A1 | 1/2019 | Masters |
| 2019/0012662 A1 | 1/2019 | Krellenstein et al. |
| 2019/0034923 A1 | 1/2019 | Greco et al. |
| 2019/0102756 A1* | 4/2019 | Zhou ...................... G09C 5/00 |
| 2019/0158275 A1 | 5/2019 | Beck |
| 2019/0164153 A1 | 5/2019 | Agrawal et al. |
| 2019/0165943 A1 | 5/2019 | Chari et al. |
| 2019/0173854 A1 | 6/2019 | Beck |
| 2019/0190701 A1 | 6/2019 | Mitra et al. |
| 2019/0238525 A1 | 8/2019 | Padmanabhan et al. |
| 2019/0286102 A1 | 9/2019 | Carbone et al. |
| 2019/0299105 A1 | 10/2019 | Knight et al. |
| 2019/0303541 A1 | 10/2019 | Reddy et al. |
| 2019/0370792 A1 | 12/2019 | Lam |
| 2020/0013118 A1 | 1/2020 | Treat et al. |
| 2020/0059361 A1 | 2/2020 | Konda et al. |
| 2020/0059362 A1 | 2/2020 | Brody et al. |
| 2020/0059364 A1 | 2/2020 | Konda et al. |
| 2020/0067907 A1 | 2/2020 | Avetisov et al. |
| 2020/0074518 A1 | 3/2020 | Kumaraswamy et al. |
| 2020/0076615 A1 | 3/2020 | Redpath et al. |
| 2020/0127833 A1 | 4/2020 | Konda et al. |
| 2020/0127834 A1 | 4/2020 | Westland |
| 2020/0159847 A1 | 5/2020 | Smith et al. |
| 2020/0160319 A1 | 5/2020 | Smith et al. |
| 2020/0175623 A1 | 6/2020 | Howie |
| 2020/0193425 A1 | 6/2020 | Ferenczi et al. |
| 2020/0193429 A1 | 6/2020 | Babar et al. |
| 2020/0234386 A1 | 7/2020 | Blackman et al. |
| 2020/0275273 A1 | 8/2020 | Smith et al. |
| 2020/0322154 A1 | 10/2020 | Konda et al. |
| 2020/0327100 A1 | 10/2020 | Androulaki et al. |
| 2020/0327112 A1 | 10/2020 | Glickshtein |
| 2020/0328894 A1 | 10/2020 | Baker |
| 2020/0328899 A1 | 10/2020 | Glickshtein |
| 2020/0410460 A1 | 12/2020 | Nissan et al. |

FOREIGN PATENT DOCUMENTS

| | | |
|---|---|---|
| CN | 109359948 A | 2/2019 |
| WO | WO 2017/187395 | 11/2017 |
| WO | WO 2018/007828 | 1/2018 |
| WO | WO 2018/028777 | 2/2018 |
| WO | WO 2018/144302 | 8/2018 |
| WO | WO-2019180702 A1 | 9/2019 |

OTHER PUBLICATIONS

Office Action for U.S. Appl. No. 16/283,452, dated Jul. 10, 2019, 31 pages.

Office Action for U.S. Appl. No. 16/283,452, dated Nov. 6, 2019, 34 pages.

International Search Report and Written Opinion for International Application No. PCT/US2019/046532, dated Dec. 2, 2019, 10 pages.

International Search Report and Written Opinion for International Application No. PCT/US2019/046808, dated Dec. 2, 2019, 9 pages.

International Search Report and Written Opinion for International Application No. PCT/US2019/057246, dated Feb. 4, 2020, 8 pages.

Office Action for U.S. Appl. No. 16/659,335, dated Apr. 23, 2020, 12 pages.

Office Action for U.S. Appl. No. 16/659,335, dated Aug. 13, 2020, 15 pages.

International Search Report and Written Opinion for International Application No. PCT/US2019/057262, dated Jan. 24, 2020, 9 pages.

International Search Report and Written Opinion for International Application No. PCT/EP2020/060610, dated Jul. 27, 2020, 17 pages.

Invitation to Pay Additional Fees and Partial International Search Report for International Application No. PCT/EP2020/060623, dated Jun. 17, 2020, 12 pages.

International Search Report and Written Opinion for International Application No. PCT/EP2020/060623, dated Aug. 7, 2020, 16 pages.

Andreev, O., "Hidden in Plain Sight: Transacting Privately on a Blockchain. Introducing Confidential Assets in the Chain Protocol," [Online], Retrieved from the Internet: <URL: https://blog.chain.com/hidden-in-plain-sight-transacting-privately-on-a-blockchain-835ab7 . . . ], Retrieved on Aug. 27, 2018, 11 pages.

Bunz, B. et al., "Zether: Towards privacy in a smart contract world," IACR, International Association for Cryptologic Research, vol. 20190226:031535, Feb. 20, 2019, Retrieved from the Internet: <URL:http://eprint.iacr.org/2019/191.pdf>, Retrieved on Feb. 20, 2019, 49 pages.

Ben-Sasson, E. et al., "Scalable, transparent, and post-quantum secure computational integrity," Cryptology ePrint Archive, Report 2018/046 (2018), 83 pages.

Clifton, M., "Understanding Merkle Trees—Why use them, who uses them, and how to use them," [Online], www.codeproject.com, pp. 1-31 (2017).

Dinh, T. T. A. et al., "Blockbench: A framework for analyzing private blockchains," [Online], Retrieved from the Internet: <URL: https://arxiv.org/abs/1703.04057>arXiv:1703.04057v1, Mar. 12, 2017, 16 pages.

Khalil, R et al., "NOCUST—A securely scalable commit-chain," Feb. 15, 2019, Retrieved from the Internet: <URL:https://eprint.iacr.org/eprint-bin/getfile.plentry=2018/642&version=20190215:182502&file=642.pdf>, Retrieved on Mar. 10, 2020, 27 pages.

Lee, C. H. et al., "Implementation of IoT system using blockchain with authentication and data protection," 2018 International Conference on Information Networking (ICOIN), IEEE, Jan. 10, 2018, pp. 936-940.

Menezes, A. et al., "Key Management Techniques," Chapter 13 in Handbook of Applied Cryptography, CRC Press, Boca Raton, FL, (1996), pp. 543-590.

Narula, N. et al., "zkLedger: Privacy-preserving auditing for distributed ledgers," Proceedings of the 15th USENIX Symposium on Networked Systems Design and Implementation (NSDI '18), Apr. 9-11, 2018, Renton, WA, USA, 17 pages.

Jiang, Y. et al., "A privacy-preserving e-commerce system based on the blockchain technology," 2019 IEEE International Workshop on Blockchain Oriented Software Engineering (IWBOSE 2019), Hangzhou, China, Feb. 2019, pp. 50-55.

(56) References Cited

OTHER PUBLICATIONS

Parno, B. et al., "Pinocchio: Nearly practical verifiable computation," S&P (2013), 16 pages.

Groth, J. et al., "Snarky signatures: Minimal signatures of knowledge from simulation-extractable SNARKs," In: Katz, J., Shacham, H. (eds.) CRYPTO 2017. LNCS, vol. 10402, pp. 581-612. Springer, Cham (2017).

Wu, H., "DIZK: Distributed zero-knowledge proof systems," In USENIX Security (2018), 35 pages.

Orcutt, M., "A tool developed for blockchains makes it possible to carry out a digital transaction without revealing any more Information than absolutely necessary," MIT Technology Review 121.2: 45(1). Technology Review, Inc. (Mar. 2018-Apr. 2018).

Zhang, Y. et al., "Z-Channel: Scalable and efficient scheme in zerocash," 2017, [Online], Retrieved from the Internet: https://eprint.iacr.org/2017/684, pp. 1-39.

Kosba, A. et al., "Hawk: The Blockchain Model of Cryptography and Privacy-Preserving Smart Contracts," 2016 IEEE Symposium on Security and Privacy, May 2016, pp. 839-858.

International Search Report and Written Opinion for International Application No. PCT/EP2020/060626, dated Sep. 3, 2020, 12 pages.

Magazzeni, D. et al., "Validation and verification of smart contracts: A research agenda," Computer, vol. 50, No. 9, Sep. 2017, pp. 50-57.

Office Action for U.S. Appl. No. 16/383,845 dated Sep. 29, 2021, 11 pages.

Office Action for U.S. Appl. No. 16/534,858, dated Jun. 23, 2021, 11 pages.

Xu, L. et al., "DL-BAC: Distributed Ledger Based Access Control for Web Applications," 2017 International World Wide Web Conference Committee (IW3C2), WWW17 Companion, Apr. 3-7, 2017, Perth, Australia; pp. 1445-1450.

Office Action for U.S. Appl. No. 16/383,845, dated Apr. 25, 2022, 13 pages.

Office Action for U.S. Appl. No. 16/542,701, dated Jun. 9, 2022, 28 pages.

Office Action for U.S. Appl. No. 16/848,284, dated Mar. 10, 2022, 11 pages.

\* cited by examiner

METHODS AND SYSTEMS FOR TRACKING AND RECOVERING ASSETS STOLEN ON DISTRIBUTED LEDGER-BASED NETWORKS

CROSS-REFERENCE TO RELATED PATENT APPLICATION

This application claims priority to and the benefit of U.S. Provisional Application No. 62/834,352, filed Apr. 15, 2019, entitled "Methods and Systems for Tracking and Recovering Assets Stolen on Distributed Ledger-Based Networks," which is incorporated herein by reference in its entirety.

FIELD OF THE DISCLOSURE

The instant disclosure illustrates how the privacy and security of activities occurring on distributed ledger-based networks (DLNs) can be enhanced with the use of zero-knowledge proofs (ZKPs) that can be used to verify the validity of at least some aspects of the activities without private information related to the activities necessarily being revealed publicly. Methods and systems that are directed at facilitating the identification, tracking and recovery of assets stolen on ZKP-enabled DLNs while preserving the confidentiality of the tokens are presented herein.

BACKGROUND

Distributed ledger-based networks (DLNs) dispense with the need for a central authority to manage the operations of the networks due to the DLNs' transparency and consensus-based verification mechanisms for validating actions occurring on the DLNs, which allow participants of the networks to trust the accuracy of the validations without the central authority. The transparency and consensus-based verification mechanisms, however, compromise the privacy of the actions and the involved parties, as relevant information has to be shared with at least a substantial portion of the participants of the DLNs for the actions to be validated.

SUMMARY

Figure 1:
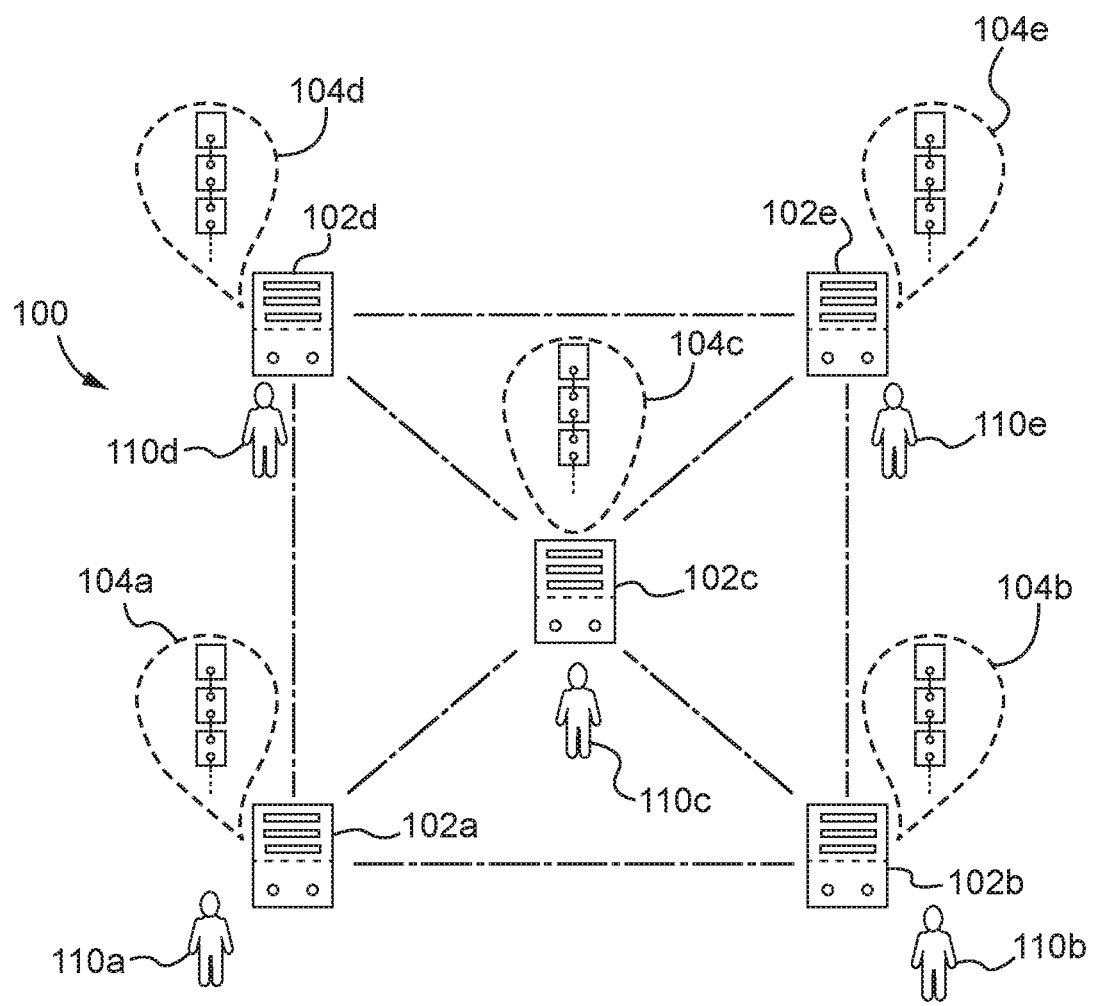
FIG. 1 shows a distributed ledger-based network configured for use in managing and conducting a private transaction between multiple parties that are participants of the network, according to some embodiment.

In some embodiments, methods and systems are directed at facilitating the identification, tracking and recovery of assets stolen on zero-knowledge proof (ZKP)-enabled distributed ledger-based networks (DLNs) while preserving the confidentiality of the tokens. For example, a method comprises receiving, at a computing node of a DLN and from a requester compute device of a requester, a request for recovery for a first token commitment representing an asset on the DLN, the first token commitment generated via an application of a first hashing function on an asset token identifying the asset, a first public identifier on the DLN of the requester, a first random nonce and a first counting value. The request for recovery can include (1) a second token commitment generated via an application of a second hashing function on the asset token, a second public identifier on the DLN of the requester, a second random nonce and a second counting value, and (2) a ZKP that (i) a token commitments data structure on the DLN that contains token commitments approved for addition onto the DLN includes the first token commitment, and/or (ii) the second token commitment is generated via an application of the second hashing function on a group including the asset token used to generate the first token commitment.

Further, the method can comprise verifying the ZKP in response to receiving the request for recovery. The method can also comprise receiving an indication of approval of the request for recovery from an arbitrator compute device of an arbitrator. In addition, the method can comprise adding, via the computing node, the second token commitment onto the token commitments data structure in response to the ZKP being verified and the indication of the approval of the request for recovery being received. In some embodiments, the method comprises incrementing by one a public record of a number of approved requests for recovery submitted for the asset after the second token commitment is added onto the token commitments data structure. In such cases, the public record can be configured to cloak a publicly identifying information of the asset and/or the asset token. In some embodiments, the method further includes incrementing by one a public record of a number of pending requests for recovery submitted for the asset prior to the indication of approval of the request for recovery is received from the arbitrator.

In some embodiments, the first public identifier can be a first public key of the requester on the DLN, and the ZKP can further include the ZKP that the requester is capable of deriving a private key used to generate the first public key from a master key that is reserved for deriving the private key. Further, the ZKP can also include the ZKP that the first token commitment is generated via the application of the first hashing function on the group including the first public key on the DLN of the requester. In some embodiments, the first counting value and the second counting value are drawn from a countable set of counting values, the second counting value obtained by incrementing the first counting value by a unit of the countable set.

In some embodiments, the arbitrator may be included within a plurality of arbitrators, and the indication of approval of the request for recovery can include a majority vote of the plurality of arbitrators approving the request for recovery. In some embodiments, the token commitments data structure can be a Merkle tree (i.e., be in the form of a Merkle tree).

In some embodiments, a method comprises receiving, at a processor, a request that is configured to cause a representation of an asset on a DLN, the asset identified on the DLN by an asset token. Further, the method includes generating, in response to the request and via the processor, a token commitment to represent the asset on the DLN by hashing a group that includes the asset token and a counting value of a countable set that includes a plurality of counting values configured to count a number of times a request for recovery is submitted for the token commitment, the counting value of the countable set being a starting counting value of the countable set. The method also comprises initializing, via the processor, a public record of the number of times the request for recovery is submitted for the asset, an initial value of the public record uniquely associated with the starting counting value. Further, the method includes providing, via the processor and to a self-executing code segment on the DLN, a ZKP that (1) the token commitment is generated by hashing a group that includes the starting value of the countable set, and/or (2) the counting value of the countable set is the starting counting value of the countable set. In addition, the method comprises receiving, in response to verification of the ZKP by the self-executing code segment, a confirmation confirming the representation of the asset by the token commitment on the DLN. The receiving the confirmation can occur without an identifying information of the asset and/or the asset token being revealed on the DLN.

In some embodiments, the ZKP includes that the counting value of the countable set is obtained from a pre-determined algorithm configured to compute the starting counting value of the countable set. In some embodiments, the public record is configured to cloak a publicly identifying information of the asset and/or the asset token. In some embodiments, the confirmation includes an indication that the token commitment is added onto a token commitments data structure on the DLN that contains token commitments approved for addition onto the DLN.

In some embodiments, a method comprises receiving, at a sender compute device of a sender and from a recipient computer device of a recipient, a request that is configured to cause a transfer of an asset from the sender to the recipient, the asset represented on a DLN by a first token commitment obtained via an application of a first hashing function on a group that includes an asset token associated with the asset, a public identifier on the DLN of the sender and a first counting value. Further, the method comprises generating, in response to the request and via the sender compute device, a second token commitment via an application of a second hashing function on a group that includes the asset token, a public identifier on the DLN of the recipient and a second counting value, the second counting value being same as the first counting value. The method also comprises sending the second token commitment to a self-executing code segment on the DLN in response to the second token commitment being generated. In addition, the method includes generating via the sender compute device, a ZKP that (1) the second token commitment is generated via the application of the second hashing function on the group that includes the asset token, the public identifier on the DLN of the recipient and the second counting value, and/or (2) the second counting value is same as the first counting value. The method also comprises sending, in response to the ZKP being generated, the ZKP to the self-executing code segment to cause the self-executing code segment verify the ZKP. In addition, the method comprises receiving, at the sender compute device and in response to verification of the ZKP by the self-executing code segment, a confirmation confirming that the second token commitment is added onto a token commitments data structure of the DLN that contains token commitments approved for addition onto the DLN. In some embodiments, the confirmation includes an indication that the first token commitment is invalidated as a representation of the asset on the DLN. The receiving the confirmation can occur without the asset token and/or the asset being revealed publicly on the DLN In some embodiments, a method comprises receiving, at a computing node of a DLN, a report identifying a token commitment representing an asset on the DLN as an invalid, the token commitment generated via an application of a hashing function on a group that includes an asset token identifying the asset, a public identifier on the DLN of a recipient of the asset and a first counting value. The report can include a ZKP that a second counting value that corresponds to a value of a public record of a number of approved requests for recovery submitted for token commitments representing the asset is greater than the first counting value. Further, the method comprises verifying the ZKP in response to receiving the report. In addition, the method includes generating, via the computing node, and sending, to the recipient, a confirmation confirming that the token commitment is invalid.

In some embodiments, the ZKP can further include the ZKP that the token commitment is generated via the application of the hashing function on the group that includes the asset token identifying the asset, the public identifier on the DLN of the recipient and/or the first counting value. The value of the public record of the number of approved requests for recovery submitted for the asset can include the value of the public record of the number of requests for recovery submitted for the asset and approved by an arbitrator of requests for recovery.

DETAILED DESCRIPTION

In some embodiments, parties participating in a transaction may elect to use a public distributed ledger-based network (DLN) to document the details of the transaction and manage its operations. DLNs can provide decentralized platforms that are transparent to at least all the participants of the networks, if not to the public at large, and as such, can be viewed as consensus-based platforms that facilitate trust between transaction participants without the need for a central authority to administer the network. For example, parties participating in a transaction for a sale of a digital music file can use a self-executing code or program (e.g., a smart contract) on the DLN (e.g., a blockchain) to manage the sale of the music file. The self-executing code or smart contract can regulate the exchange of the music file and the correct payment for the file between the parties without involvement from a third party. In some embodiments, the DLNs can also be used to manage transactions involving physical (e.g., non-digital) assets. In some implementations, this can be accomplished by using tokens to represent the assets, and a sale of an asset can be represented by the transfer of the token representing the asset from one party (e.g., the seller) to a second party (e.g., the buyer).

In some embodiments, a DLN can be and/or support a blockchain. Throughout the instant disclosure, in some embodiments, the terms "distributed ledger-based network" and "blockchain network" may be used interchangeably. Similarly, in some embodiments, the terms "self-executing code" or "self-executing code segment" and "smart contract" may be used interchangeably. Further, in some embodiments, the term "transaction" may be used to refer to off-chain transactions (e.g., transactions involving the sale of physical or digital assets between parties) and/or on-chain representation of these off-chain transactions (e.g., the transaction of tokens that represent the assets on the blockchain network). Whether the term refers to the former or the latter case should be clear from context. The terms "off-chain" or "off-the DLN" are to be understood to mean "not on the blockchain network" or "not on the DLN." For example, a statement such as "the application of a hashing function is performed off-the DLN" is to be understood as meaning "the application of the hashing function is not performed on the DLN (and is performed elsewhere)".

As noted above, in some embodiments, the trust the distributed ledger-based networks provide with no need for a central authority derives from the transparency of the networks to at least all the participants of the network (and in the case of public networks, to the public at large). This transparency, however, can reduce or even eliminate any privacy or confidentiality that participants need or seek when interacting with the network or its participants. For example, in the case of public networks, any interested person can access and inspect the distributed ledgers on the networks to obtain detailed information on all transactions that are represented on the ledgers since the inception of the networks (as the ledgers are, in at least most cases, largely immutable). In some implementations, the lack of privacy or confidentiality can render the use of a public ledger-based network untenable. For instance, a pharmacy using a public blockchain network to manage the fulfillment of orders for shipment of prescription drugs without a mechanism to conceal at least some aspects of the transaction would publicly expose personal and health-related data of its customers (thereby violating their privacy and possibly health privacy laws). In some embodiments, zero-knowledge proofs (ZKPs) can be used on ZKP-enabled DLNs to provide enhanced privacy to transactions and related accounts on the ZKP-enabled DLNs. For example, as discussed below, ZKPs can allow a participant of a ZKP-enabled DLN that has lost asset tokens to theft to report the theft to an arbitrator (e.g., an independent third party that is engaged by the participant and/or designated by multiple participants of the ZKP-enabled DLN 100 to assess requests for recovery of lost asset tokens, such as but not limited to, an insurer of the asset tokens) without having to disclose the participant's identity (e.g., the participant's public key on the ZKP-enabled DLN 100), the identity of the lost asset tokens, the identity of the off-chain assets identified on the ZKP-enabled DLN 100 by the lost asset tokens, and/or etc.

In some embodiments, the use of ZKPs in ZKP-enabled DLNs may not completely prevent security lapses that result in the misallocation of asset tokens stored in accounts of the ZKP-enabled DLNs. For example, a private key of an account may be accessed by a participant of the ZKP-enabled DLNs other than the rightful owner of the account, and the participant may transfer ownership of the asset tokens in the account illegitimately, i.e., without the consent of the rightful owner, to a different account not controlled by the rightful owner. The term "rightful owner," in some implementations, is to be understood as referring to a participant of a ZKP-enabled DLN 100 that presents a valid request for recovery of a lost asset token (e.g., a claim for indemnity) to an arbitrator such as the afore-mentioned independent third party tasked with considering and settling the request (e.g., an insurer of the asset token), where the arbitrator can also be a participant of the ZKP-enabled DLN 100. For instance, the rightful owner can be a participant of the ZKP-enabled DLN 100 that can present, to an arbitrator's satisfaction, evidence of legitimate or legal ownership rights over the lost asset token. As another example, the assets may be transferred to a different account inadvertently and irreversibly (transferred by the rightful owner or otherwise to an account whose owner is unwilling or unable to return the assets, for example). In any case, the security lapses may result in the assets contained within an account on a ZKP-enabled DLN 100 being unavailable to the rightful owner of the account, and the rightful owner may wish to track the lost asset tokens and request for their recovery from an arbitrator tasked with reviewing and settling the request.

The rightful owner can, for example, request for recovery of the lost assets by disclosing to the arbitrator, who may be a participant on a ZKP-enabled DLN 100, the identities of the rightful owner as well as those of the lost asset tokens. The rightful owner may make the disclosure either on the ZKP-enabled DLN 100 or off the ZKP-enabled DLN 100. The rightful owner may not wish to claim indemnity on the ZKP-enabled DLN 100, however, as the disclosure can reveal private information (e.g., identifying information of the rightful owner as well as his/her asset tokens and/or off-chain assets identified on the ZKP-enabled DLN 100 by the asset tokens) to the public or at least to all participants of the ZKP-enabled DLN. The latter may not be possible or at least desirable either, as an indemnification claim system separate from the ZKP-enabled DLN may not be available, or may be costly to set up and maintain (in addition to lacking the advantages that are inherent to DLNs such as, but not limited to, decentralization, near or complete immutability, auditability and/or the like).

In some embodiments, methods and systems allow a rightful owner of an asset token on a ZKP-enabled DLN 100 to track lost asset tokens and present a recovery request for the lost asset tokens to an arbitrator without having to reveal personal information related to the rightful owner, the lost asset tokens (e.g., for which the claim is being made) and/or the off-chain assets identified on the ZKP-enabled DLN 100 by the lost asset tokens. For example, as discussed in detail below, after discovering that an asset token is lost, the rightful owner of the asset token may generate a ZKP to disclose the loss and prove the rightful owner's ownership of the asset token to the arbitrator without having to reveal on the ZKP-enabled DLN 100, the identity of the lost asset token, the off-chain assets identified on the ZKP-enabled DLN 100 by the lost asset token, and/or the rightful owner. Further, the rightful owner may generate a ZKP to prove to the arbitrator that the request for recovery is in fact submitted by the rightful owner, again without having to reveal the identity of the rightful owner, the lost asset token and/or the off-chain asset identified on the ZKP-enabled DLN 100 by the lost asset token. As such, the use of ZKPs on ZKP-enabled DLNs facilitate the tracking of asset tokens lost on ZKP-enabled DLNs, as well as the submission of a request for recovery of the lost asset tokens to an arbitrator, while still preserving, at least substantially, the privacy afforded by ZKP-enabled DLNs.

FIG. 1 shows a ZKP-enabled DLN configured for use in managing and representing a private transaction between two parties that are participants of the network, in particular a public network, according to an embodiment. As shown in FIG. 1, the ZKP-enabled DLN or blockchain network 100 includes multiple computing nodes 102a-102e configured to communicate amongst each other via a peer-to-peer (P2P) connection. In some implementations, the computing nodes 102a-102e can each be computing devices including but not limited to a computer, server, processor, data/information processing machine or system, and/or the like, and include a data storage system such as a database, memory (volatile and/or non-volatile), etc. In some implementations, the P2P connections may be provided by wired and/or wireless communications systems or networks (not shown) such as but not limited to the internet, intranet, local area networks (LANs), wide area networks (WANs), etc., using wireless communication protocols or standards such as WiFi®, LTE®, WiMAX®, and/or the like.

In some embodiments, the ZKP-enabled DLN 100 may include self-executing codes or smart contracts that are configured to execute upon fulfillment of conditions that are agreed upon between transacting parties. For example, some or all of the computing nodes 102a-102e may include copies of a self-executing code that self-execute upon fulfillment of the conditions. In some implementations, the computing nodes 102a-102e may communicate amongst each other with the results of the executions of their respective self-executing codes, for example, to arrive at a consensus on the results. In some implementations, one or a few of the computing nodes 102a-102e may have self-executing codes that self-execute, and the results for which can be transmitted to the rest of the computing nodes 102a-102e for confirmation.

In some embodiments, a self-executing code or a smart contract can facilitate the completion of transactions on the ZKP-enabled DLN 100 by providing the transacting parties confidence that the other party would deliver the promised product or payment. For example, with reference to the above example related to the sale of a digital music file, a smart contract can be used to verify that the seller of the file is in fact an owner of the file, the buyer of the music file has adequate resource to pay for the music, etc. Further, the smart contract can facilitate the exchange of the music file by allowing the transfer of a payment to occur only after the transfer of the music file is completed (and validated).

In some embodiments, the ZKP-enabled DLN 100 may be linked to one or more compute device(s) such as oracles (not shown) or data feeds that provide external data to the ZKP-enabled DLN 100. In some implementations, as discussed above, self-executing codes or smart contracts can automatically execute upon realization of some conditions of a transaction, and the oracles may provide the data that can be used to evaluate whether the conditions are met. For example, a transaction may be contingent on the price of a stock, a weather condition, etc., and an oracle may provide the requisite information to the smart contract facilitating the transaction. The smart contract, upon receiving the information, may self-execute after determining that the condition for the transaction has been fulfilled. In some embodiments, the oracles may gather information related to the smart contract and/or the ZKP-enabled DLN 100 (e.g., for use by external systems). For example, the oracle may query the state of the smart contract periodically and register any changes (which may be accessed later by the external systems). As another example, an execution of the smart contract may cause changes to the ZKP-enabled DLN 100 or parts thereof (e.g., to a storage system of the ZKP-enabled DLN 100) and the oracle may query for and register these changes, again for later access by the external systems.

In some embodiments, at least a substantial number of the computing nodes 102a-102e (e.g., at least greater than 50% of the total number of computing nodes 102a-102e that make up the ZKP-enabled DLN 100) include copies of a distributed ledger 104a-104e onto which transactions that occur on the network are recorded. The recording of the transactions on the distributed ledger 104a-104e may occur when some substantial number of the computing nodes 102a-102e, or a subset thereof, agree on the validity of the transactions. The distributed ledger 104a-104e can be immutable or nearly immutable in the sense that to alter the distributed ledger 104a-104e, at least this substantial number of the computing nodes 102a-102e would have to agree, which can be increasingly difficult when the number of computing nodes 102a-102e is large (and the distributed ledger 104a-104e gets longer).

As noted above, the ZKP-enabled DLN 100 can be used to facilitate transactions that involve digital assets (e.g., sale of digital music files). In some embodiments, the ZKP-enabled DLN 100 can also be used to facilitate transactions of assets that occur off-chain or off-line (e.g., transactions of physical assets). In some implementations, off-chain assets can be represented by tokens (e.g., token commitments) on the ZKP-enabled DLN 100, and the sale or transfer of the off-chain assets can be represented on the ZKP-enabled DLN 100 by the transfer of the tokens between the blockchain accounts of the transacting parties. In some implementations, the types of tokens used to represent the off-chain assets can depend on the nature of the assets themselves. For example, fungible products (e.g., some amount of gasoline or a currency) can be represented with fungible tokens while non-fungible products (e.g., distinguishable products such as a product with a serial number) can be represented by non-fungible tokens. In some embodiments, tokens may be stored off-chain, i.e., off of the ZKP-enabled DLN 100. For example, tokens may be stored in storage systems or databases that are off of the ZKP-enabled DLN 100 but linked or coupled with the ZKP-enabled DLN 100. For instance, if the ZKP-enabled DLN 100 is a ZKP-enabled Ethereum blockchain network, the tokens may be stored in a Swarm database (i.e., a database configured according to the Ethereum storage protocol). In some embodiments, the tokens may be stored on the ZKP-enabled DLN 100 (e.g., in the storage systems associated with the computing nodes 102a-102e).

In some embodiments, as noted above, transactions that occur on the ZKP-enabled DLN 100 (including off-chain transactions that are represented on the ZKP-enabled DLN 100 with the use of tokens, for example) are recorded onto at least a substantial number (e.g., a majority, at least 60%, at least 75%, etc.) of the distributed ledgers 104a-104e that exist on the ZKP-enabled DLN 100. For example, a transaction between a first transaction participant 110a and a second transaction participant 110b on the ZKP-enabled DLN 100 representing the transfer of an off-chain asset (not shown) from the former to the latter would be recorded on all or nearly all of the distributed ledgers 104a-104e after at least a substantial number of the participants of the ZKP-enabled DLN 100 consent to the transaction being recorded on the distributed ledgers 104a-104e of the ZKP-enabled DLN 100. In the case of a blockchain network that is not ZKP-enabled, however, the first transaction participant 110a and the second transaction participant 110b are afforded little or no privacy as all or nearly all the details of the transaction are made public or are visible to all that have access to the blockchain network (the public, in case of public blockchains), such details including confidential information on the transacting participants, the asset being transacted, the tokens used to represent the asset and the representation of its transfer on the blockchain network, and/or the like. The use of ZKPs in ZKP-enabled DLN 100 provides at least enhanced privacy to transactions that occur or are represented on ZKP-enabled DLN 100 (e.g., transactions including representations of transfers of real-world assets, such as but not limited to non-fungible assets, between participants of the ZKP-enabled DLN 100), as discussed in Applicant's U.S. Provisional Application No. 62/719,636, filed Aug. 18, 2018, entitled "Methods and Systems of ZKP-Based Secure PE Transactions on Public Networks," U.S. Non-Provisional application Ser. No. 16/534,858, filed Aug. 7, 2019, entitled "Methods and Systems for Enhancing Privacy on Distributed Ledger-Based Networks", U.S. Non-Provisional application Ser. No. 16/283,452, filed Feb. 2, 2019, entitled "Methods and Systems for enhancing Privacy and Efficiency on Distributed Ledger-Based Networks," U.S. Non-Provisional application Ser. No. 16/542,701, filed Aug. 16, 2019, entitled "Methods and Systems for Implementing Zero-Knowledge Proofs in Transferring Partitioned Tokens on Distributed Ledger-Based Networks", each of which is incorporated by reference herein in its entirety.

In some embodiments, ZKPs can be used by a first entity, the "prover" or "provider" of the proofs, to convince a second entity, the "verifier" of the proofs, that a statement about some secret information is truthful without having to reveal the secret information to the verifier. For example, as noted above, ZKPs can be used by a participant of a ZKP-enabled DLN that has lost assets or tokens to theft to report the theft to an arbitrator (e.g., insurer of the assets) without having to disclose the participant's identity (e.g., the participant's public key on the ZKP-enabled DLN), the identity of the lost assets, and/or etc. ZKPs can be interactive, i.e., require interaction from the prover for the verifier to verify the truthfulness of the statement. In some embodiments, the ZKPs can be non-interactive, requiring no further interaction from the prover for the verifier to verify the statement. Examples of non-interactive ZKPs include zero-knowledge succinct non-interactive argument of knowledge (zk-SNARK), zero-knowledge scalable transparent argument of knowledge (zk-STARK), etc. Discussions of ZKPs can be found in Applicant's U.S. Non-Provisional application Ser. No. 16/383,845, filed Apr. 15, 2019, entitled "Methods and Systems for Identifying Anonymized Participants of Distributed Ledger-Based Networks Using Zero-Knowledge Proofs," which is incorporated by reference herein in its entirety.

Figure 2:
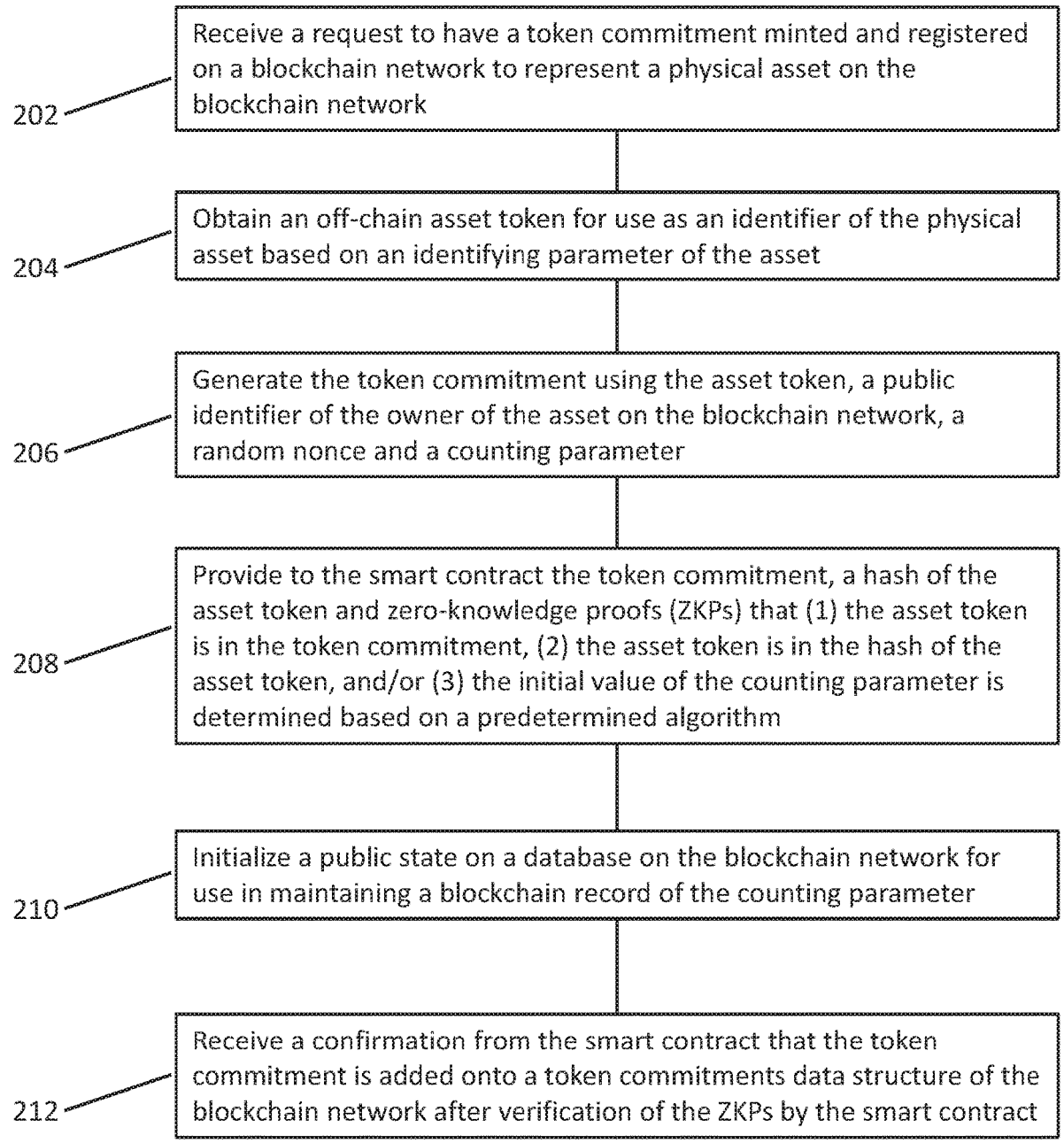
FIG. 2 shows a flow chart illustrating the minting of a token commitment on a distributed ledger-based network to represent a real world or physical asset on the distributed ledger-based network, according to some embodiment.

FIG. 2 shows a flow chart illustrating the steps of minting a token commitment on a ZKP-enabled DLN to represent a real world (e.g., off-chain) or physical asset on the ZKP-enabled DLN, according to an embodiment. To represent an off-chain transaction for a non-fungible asset such as the transfer of an off-chain asset from a first transaction participant 110a (referred hereinafter as the sender 110a) to a second transaction participant 110b (referred hereinafter as the recipient 110b) on the ZKP-enabled DLN 100, in some embodiments, the sender 110a may initially generate, at 202 and using the computing node 102a, an asset identifier that can serve as a unique identifier for the asset while concealing the asset's identity. In some implementations, the asset identifier may be generated in response to a request to have the non-fungible asset represented on a ZKP-enabled DLN 100 so that the off-chain transaction of the non-fungible asset can be represented on the ZKP-enabled DLN 100. In some implementations, the sender 110a can generate, using the computing node 102a, an alpha-numeric value that is uniquely associated with some identifying parameters (e.g., serial numbers, model numbers, etc.) of the asset, and the alpha-numeric value can be used as the asset identifier that hides the real identity of the non-fungible physical asset. As another example, a unique asset identifier can be generated by cryptographically hashing the identifying parameters of the non-fungible physical asset to generate an asset token that can serve as the unique asset identifier.

In some implementations, the cryptographic hashing computation can include the application of a cryptographic hashing algorithm or function H such as but not limited to the SHA-256 algorithm or function, on the identifying parameters of the non-fungible physical asset. For instance, if the non-fungible physical asset is a vehicle, an asset token to represent the vehicle on the ZKP-enabled DLN 100 can be generated by applying a hashing function (e.g., SHA-256) on one or more of the identifying parameters of the vehicle such as the vehicle identification number, model type, model year, etc. As a non-limiting example, a unique asset identifier or asset token A for a vehicle can be generated by computing A=H(VIN), where VIN is the vehicle identification number of the vehicle and H is a hashing function or algorithm. Accordingly, the asset token can serve as a unique asset identifier without exposing or revealing to other participants of the ZKP-enabled DLN 100 any of the identifying parameters of the asset (e.g., vehicle). In some embodiments, the hashing can occur off the ZKP-enabled DLN 100. For example, if the ZKP-enabled DLN 100 is a ZKP-enabled Ethereum blockchain network, in some implementations, the asset token can be generated and stored off the Ethereum blockchain network at a Swarm storage network/database.

At 204, a non-fungible physical asset can be registered or represented on the ZKP-enabled DLN 100 for the first time by generating or minting a non-fungible token commitment that encodes at least some aspects of the non-fungible asset and/or the ownership of the asset on the ZKP-enabled DLN 100. In some embodiments, minting of a token commitment may refer to the registration or representation of an asset on the ZKP-enabled DLN 100 by a token commitment for the first time. As will be discussed below, new token commitments may be generated later to represent an asset that is being represented on the ZKP-enabled DLN 100 by an existing token commitment. In such cases, however, the asset is being transferred to a new owner, and the generation of the new token commitment may be accompanied by the invalidation of the existing token commitment (which indicates that the asset does not belong to the initial owner anymore). In any case, whether an asset (e.g., non-fungible asset) is being registered or represented on the ZKP-enabled DLN 100 for the first time by the minting of a token commitment or the transfer of the asset from one owner to another is being registered on the ZKP-enabled DLN 100 by generation of a new token commitment, the initially minted token commitment and/or the new token commitment may encode at least some aspects of the asset and/or the ownership of the asset. To encode aspects of the non-fungible asset, in some implementations, a cryptographic hashing function or algorithm can be applied to a unique asset identifier of the asset (e.g., the asset token) that itself was obtained via an application of a hashing function on the identifying parameters of the non-fungible asset, as discussed in the example above. Further, to encode some aspects of the ownership of the asset, in some implementations, the cryptographic hashing function can also be applied to a public identifier on the ZKP-enabled DLN 100 that is associated with the owner (e.g., sender 110a when the sender 110a is minting the token commitment for the first time). An example of such public identifier includes the public key of the sender on the ZKP-enabled DLN 100 (i.e., the public key that is associated with the sender 110a on the ZKP-enabled DLN 100).

In some embodiments, the cryptographic hashing function can also be applied to, among other things, a random nonce such as, but not limited to, a random or serial number that is securely generated and used, at least in most cases, only once. In some implementations, a nonce $S_i$ can be a randomly chosen number of sufficient length such that the probability of generating the same number again in a subsequent transaction is at most infinitesimally small (and as such, may be neglected). For instance, the nonce $S_i$ may be a randomly selected 256-bit number. As such, the use of a random nonce in generating a non-fungible token commitment results in the non-fungible token commitment being unique, independent of the non-fungible asset (e.g., encoded by the asset token) and/or its ownership (e.g., encoded by the public key) that are also used in generating the non-fungible token commitment.

As discussed above, in some embodiments, a token commitment configured to represent a non-fungible asset on the ZKP-enabled DLN 100 may be generated by the application of a cryptographic hashing function collectively on an asset token identifying the asset, a public identifier on the ZKP-enabled DLN 100 of the owner (e.g., rightful owner) of the asset token and a random nonce. In some embodiments, in generating the token commitment, the cryptographic hashing function may also be applied to, in addition to the asset token, the public identifier and the random nonce, a counting parameter configured for use in counting the number of times that the rightful owner of the asset token has requested the recovery of the asset token from an arbitrator after a loss or theft of the asset token, and a request was approved by the arbitrator. For example, the counting parameter can be an element of a countable set, examples of which include, whole numbers, natural numbers, odd natural numbers, even whole numbers, ordered letters, and/or the like. The use of a counting parameter in generating a token commitment may allow participants of the ZKP-enabled DLN 100 to determine whether the token commitment, and any progeny token commitment generated as a replacement thereof, are stolen or illegitimate token commitments, as discussed below.

In some embodiments, the minting of a non-fungible token commitment to represent an asset ZKP-enabled DLN 100 for the first time may include the computation of a token commitment $Z_s$ as follows: $Z_s = H(A \circledast Pk_s \circledast S_s \circledast CP_A)$, where A is the asset token identifying the asset (e.g., obtained by hashing, off-chain, at least some identifying parameters of the asset), $Pk_s$ is the public key on the ZKP-enabled DLN 100 that is associated with the sender 110*a* (i.e., the current and rightful owner of the asset), $S_s$ is a random nonce selected or generated by the computing node 102*a* of the sender 110*a*, $CP_A$ is the counting parameter for the asset token A (e.g., the number of times a request for recovery has been made for the asset token A and approved by the arbitrator), H is a cryptographic hashing function or algorithm (e.g., SHA-256), and $\circledast$ represents a combining operator (e.g., the concatenation operator |, etc.). As the token commitment $Z_s$ for the asset token A is being minted or generated for the first time, $CP_A$ may be set to a value selected from the countable set that can serve as an initial value for $CP_A$ (e.g., 0). For example, the initial value for $CP_A$ may be determined by a pre-determined or pre-approved algorithm of the ZKP-enabled DLN 100 that is used by all participants of the ZKP-enabled DLN 100 to determine an initial value for $CP_A$ when minting a token commitment for an asset token.

In some embodiments, the computation of the token commitment $Z_s$ may include application of the hashing function on additional elements besides or instead of A, $Pk_s$, $S_s$ and $CP_A$. In some embodiments, the token commitment comprises or consists of A, $Pk_s$, $S_s$ and $CP_A$. In some embodiments, the application of the hashing function in computing the token commitment $Z_s$ allows for the generation or construction of the token commitment $Z_s$ without revealing the identities of the preimages of the hashing function H, i.e., without revealing the identities A, $Pk_s$, $S_s$ and/or $CP_A$ on the ZKP-enabled DLN 100 (e.g., A, $Pk_s$, $S_s$ and/or $CP_A$ may be kept secret by the sender 110*a*).

After the token commitment is computed, at 206, the sender 110*a* may provide or publish, anonymously and using the computing node 102*a*, the token commitment and/or a hash of the asset token A, H(A), to a self-executing code or smart contract on the ZKP-enabled DLN 100 to have the token commitment minted or registered for the first time on the ZKP-enabled DLN 100. Prior to the token commitment being included in the distributed ledgers 104*a*-104*e* of the ZKP-enabled DLN 100 as a representation of the off-chain asset (e.g., identified by the asset token A) on the ZKP-enabled DLN 100, however, the sender 110*a* may have to demonstrate to the ZKP-enabled DLN 100 that (1) the token commitment in fact includes the asset token A, and/or (2) the asset is not already represented on the ZKP-enabled DLN 100, i.e., a token commitment is not already minted for the asset on the ZKP-enabled DLN 100 (e.g., to avoid "double minting," which can lead to undesirable "double spend" or "double transfer" on the ZKP-enabled DLN 100 of multiple token commitments all representing the same asset), according to some embodiments. In some implementations, the sender 110*a* may generate and provide anonymously to the smart contract, using the computing node 102*a*, a ZKP that the token commitment provided to the smart contract includes the asset token A. Further, the ZKP may also include a proof that a hash of the asset token A, H(A), includes the asset token A. In some implementations, the hash H(A) can be used by the smart contract to verify that the asset is not already represented on the ZKP-enabled DLN 100. For example, the smart contract may verify that there has never been an H(A) provided to the smart contract previously (e.g., if the asset has never been represented on the ZKP-enabled DLN 100), and if there is one, the token commitment can be rejected for "double-minting." In some implementations, the hashing of A allows the sender 110*a* to hide the identity of the asset token A and/or the off-chain asset identified by the asset token A from the ZKP-enabled DLN 100 or the smart contract. The use of H(A) by a smart contract to prevent "double-minting" is discussed in Applicant's U.S. Non-Provisional application Ser. No. 16/534,858, filed Aug. 7, 2019, entitled "Methods and Systems for Enhancing Privacy on Distributed Ledger-Based Networks", U.S. Non-Provisional application Ser. No. 16/283,452, filed Feb. 2, 2019, entitled "Methods and Systems for enhancing Privacy and Efficiency on Distributed Ledger-Based Networks," U.S. Non-Provisional application Ser. No. 16/542,701, filed Aug. 16, 2019, entitled "Methods and Systems for Implementing Zero-Knowledge Proofs in Transferring Partitioned Tokens on Distributed Ledger-Based Networks", each of which is incorporated by reference herein in its entirety.

Further, in some embodiments, the sender 110*a* may also generate and provide anonymously to the smart contract, using the computing node 102*a*, a ZKP that the initial value that was assigned to $CP_A$ when generating the token commitment was calculated or determined according to the pre-determined algorithm of the ZKP-enabled DLN 100 that was configured for calculating initial $CP_A$ values when generating token commitments for the first time. For example, the pre-determined algorithm can be an algorithm that is agreed upon (e.g., pre-approved) by most or all participants of the ZKP-enabled DLN 100 as the algorithm to be used for determining the values of $CP_A$ (including the initial value of $CP_A$ to be used when calculating $Z_s = H(A \circledast Pk_s \circledast S_s \circledast CP_A)$ for an asset token A for the first time). For instance, the predetermined algorithm may use the set of whole numbers as the countable set from which to choose $CP_A$ values, and select 0 or any other whole number as the initial value of $CP_A$ to be used when calculating $Z_s$. In such cases, the sender 110*a* may generate, using the computing node 102*a*, a ZKP that $Z_s$ was generated using an initial value for $CP_A$ that was determined or selected by the pre-determined algorithm.

In some embodiments, the sender 110a, using the computing node 102a, provides the above-mentioned ZKPs to the smart contract without having revealed the pre-images of the hashing function H that were used in generating $Z_s$, i.e., without having revealed to the participants of the ZKP-enabled DLN 100, the asset token A, the identity of the owner (e.g., the public key or identifier $Pk_s$ of the owner), the nonce $S_s$ and/or the counting parameter $CP_A$. In other words, by using ZKPs, the sender 110a can present to the ZKP-enabled DLN 100 (e.g., to the participants and/or the smart contract) proofs that $Z_s$ was generated via the application of a hashing function on A, $Pk_s$, $S_s$, and/or $CP_A$ and/or that the initial value for $CP_A$ was selected using a pre-determined or pre-approved algorithm, without having to reveal on the ZKP-enabled DLN 100 A, $Pk_s$, $S_s$ and/or $CP_A$. In some implementations, this may also allow the sender 110a to keep confidential the identity of the off-chain (e.g., physical) asset that is represented by $Z_s$ on the ZKP-enabled DLN 100. As such, the privacy of the sender 110a is enhanced or at least maintained as a result of the use of ZKPs on the ZKP-enabled DLN 100 when interacting with the smart contract (e.g., to mint a token commitment) on the ZKP-enabled DLN 100.

In some embodiments, at 208, the sender 110a, using the computing node 102a, may initialize a state variable (e.g., a public state variable) for the counting parameter $CP_A$, e.g., $CP_A^*$, on the ZKP-enabled DLN 100 for use by participants 110a-110e of the ZKP-enabled DLN 100 to determine if token commitments the participants 110a-110e received are stolen or illegitimate, as discussed below. In some implementations, the counting parameters (e.g., one for each asset token) may be stored on the ZKP-enabled DLN 100 (e.g., the storage systems associated with the computing nodes 102a-102e) in a data structure which allows participants of the ZKP-enabled DLN 100 to 'lookup' the counting parameter for a given asset token (e.g., a 'hash table' data structure, or an indexed object). In some implementations, the sender 110a may not wish to initialize the state variable for $CP_A$ (e.g., $CP_A^*$) in a data structure which is indexed by the asset token A itself, as this might reveal asset token A to all participants on the ZKP-enabled DLN 100. For example, since the state variable can be a public state variable, initializing the state variable $CP_A^*$ with reference to A directly (i.e., initializing the state variable $CP_A^*$ by storing it publicly as the 'image' of a function or hash table applied to A directly) can expose the asset token A on the ZKP-enabled DLN 100. As such, the state variable for $CP_A$ (e.g., $CP_A^*$) may be initialized with a secondary parameter that is related to $CP_A$ but hides, cloaks or obfuscates the identity of the asset token A and/or $CP_A$. For example, a secondary parameter D can be a publicly available parameter that serves as a representative of the asset token A that hides, cloaks or obfuscates A and which serves as the 'lookup' 'key' to lookup the counting parameter $CP_A^*$ as it is stored on the ZKP-enabled DLN 100. An example of such a representative of the asset token A includes a hashed value of A, e.g., D=H(A), or an encryption of A. In other words, the public state variable for $CP_A$ (e.g., $CP_A^*$) may be initialized by storing it as the image of some function which takes D as input and outputs the currently stored value of $CP_A^*$ on the ZKP-enabled DLN 100. In such implementations, an owner of a newly received token commitment might receive (e.g., in a communication channel off-the-DLN) from the sender details of all of the values of the 'pre-image' of the token commitment, including the value of $CP_A$ contained therein. The owner can then compare this value of $CP_A$ against the publicly available value $CP_A^*$ which is stored on the ZKP-enabled DLN 100 (the owner may at first need to determine the representative of the asset token A (e.g., determine D, which may be obtained by hashing A or by encrypting A) in order to lookup the value of $CP_A^*$. In some implementations, the mapping from a representative of the asset token A to the counting parameter $CP_A^*$ can be a public mapping, i.e., a mapping that is visible to all participants 110a-110e of the ZKP-enabled DLN 100 (while the value A remains private or hidden). That is, all participants 110a-110e of the ZKP-enabled DLN 100 can publicly access the value of $CP_A^*$; however, the participants 110a-110e may not be able to associate it with the asset token A unless the participants 110a-110e have access to the asset token A and/or the participants know how to decrypt the value of D to learn A (if an encryption scheme is used), so that the participants 110a-110e can compute D and obtain $CP_A^*$.

Upon receiving the token commitment $Z_s$, the hash of the asset token H(A), and/or other public parameters, and/or the ZKPs, in some embodiments, the self-executing code or smart contract may verify the ZKPs, for example, as discussed in Applicant's U.S. Non-Provisional application Ser. No. 16/383,845, filed Apr. 15, 2019, entitled "Methods and Systems for Identifying Anonymized Participants of Distributed Ledger-Based Networks Using Zero-Knowledge Proofs,", which is incorporated by reference herein in its entirety. In some implementations, the smart contract may verify the ZKPs to verify statements included in the ZKPs, such as the statements that H(A) includes A (i.e., the statement that H(A) is obtained by applying a hashing function or algorithm on the asset token A) and the statement that the token commitment $Z_s$ also includes A (i.e., the statement that $Z_s$ is obtained by applying a hashing function or algorithm on the asset token A). Further, the smart contract may verify that there has never been an H(A) provided to the smart contract previously (e.g., if the asset has never been represented on the ZKP-enabled DLN 100). In addition, the smart contract may also verify that the initial value of $CP_A$ used in calculating $Z_s$ was determined or selected by the pre-determined or pre-approved algorithm. After the verification of the ZKPs, in some implementations, the sender 110a may receive a confirmation, at 210 and via the computing node 102a, that the token commitment $Z_s$ has been approved for addition or inclusion to the commitments data structure on the ZKP-enabled DLN 100, serving as an indication that the off-chain asset identified with the asset token A is represented on the ZKP-enabled DLN 100 by the token commitment $Z_s$ and that the owner is the sender 102a, identified on the ZKP-enabled DLN 100 by the public key $Pk_s$ (which is used in generating the token commitment $Z_s$). It is to be noted that the token commitment $Z_s$ may be included into the commitments data structure without the identities of the asset token A and/or the sender 102a being revealed publicly or on the ZKP-enabled DLN 100.

In some embodiments, as noted above, the use of the counting parameter $CP_A$ in generating a token commitment may allow participants of the ZKP-enabled DLN 100 to determine whether the token commitment, and any progeny token commitment generated as a replacement thereof, are stolen or illegitimate token commitments. As will be discussed in more detail below, when a rightful owner of a lost or stolen token commitment on a ZKP-enabled DLN 100 presents a recovery request to an arbitrator (e.g., or multiple arbitrators) after the loss or theft, and such a request is approved by the arbitrator, the new replacement token commitment that may be minted to replace the lost or stolen commitment may be generated using a value for the $CP_A$ that is next in the countable set to the value of the $CP_A$ used in generating the lost or stolen token commitment. For example, if a lost token commitment is the first token commitment to represent an off-chain asset on the ZKP-enabled DLN 100, then the $CP_A$ value used in generating the token commitment may be $CP_A=0$, and a replacement token commitment generated using the next value for the counting parameter (e.g., $CP_A=1$) may then be recognized on the ZKP-enabled DLN 100 as a legitimate representation of the off-chain asset (e.g., the smart contract on the ZKP-enabled DLN 100 may include the replacement token commitment into a commitments data structure on the ZKP-enabled DLN 100 where approved or legitimate or all token commitments are stored). In such implementations, the public state variable of the $CP_A$ (e.g., $CP_A^*$) stored on the ZKP-enabled DLN 100 may also be adjusted to match the counting parameter used in generating the replacement token commitment (e.g., $CP_A^*$ adjusted from 0 to 1). As another example, if the lost token commitment is the third token commitment to represent the off-chain asset on the ZKP-enabled DLN 100 (e.g., the previous two having been lost or stolen too), the $CP_A$ value used in generating the currently lost token commitment can be 2 (e.g., the first two token commitments may have been generated using $CP_A=0$ and 1). Once the rightful owner requests recovery and an arbitrator approves it, a replacement token commitment generated using the next value for the counting parameter (e.g., $CP_A=3$) may then be recognized on the ZKP-enabled DLN 100 as a legitimate representation of the off-chain asset. Again, in such implementations, the public state variable of the $CP_A$ (e.g., $CP_A^*$) stored on the ZKP-enabled DLN 100 may also be adjusted to match the counting parameter used in generating the replacement token commitment (e.g., $CP_A^*$ adjusted from 2 to 3).

In such embodiments, participants of the ZKP-enabled DLN 100 may use information associated with a counting parameter $CP_A$ (e.g., the value of the counting parameter $CP_A$) used to generate a token commitment the participants own or received (which may be a token commitment generated to represent an off-chain asset on a ZKP-enabled DLN 100 for the first time, or a progeny thereof) to determine whether the token commitment is a stolen or illegitimate token commitment. For example, when a recipient 110b of a token commitment receives on a ZKP-enabled DLN 100 a token commitment and wants to check whether the token commitment is legitimate (e.g., not stolen), the recipient 110b may wish to determine if the $CP_A$ used to generate the token commitment matches the public state variable for $CP_A$ ($CP_A^*$) that is available or stored on the ZKP-enabled DLN 100. In some implementations, as discussed above, the recipient 110b may determine the representative of the asset token A that hides or obfuscates A on the ZKP-enabled DLN 100 (e.g., calculate D=H(A)) and 'lookup' the value of $CP_A^*$ from a public mapping from D to $CP_A^*$, to arrive at $CP_A^*$. The recipient 110b may then compare this counting parameter $CP_A^*$ (e.g., obtained from the ZKP-enabled DLN 100) to the counting parameter $CP_A$ used to generate the token commitment (e.g., which, in some cases, may be provided to the recipient 110b by the sender 110a via a communications channel that is off-chain). If the two counting parameters match, then, in some implementations, the recipient 110b may determine that the token commitment is in fact a legitimate (e.g., not stolen) token commitment. Otherwise, the recipient 110b may determine that the token commitment is an illegitimate or stolen token commitment, and report the token commitment on the ZKP-enabled DLN 100 as discussed below with reference to FIG. 3.

As discussed above, a mismatch between the counting parameter used to generate a token commitment and the counting parameter stored on the ZKP-enabled DLN 100 for that token commitment may be interpreted as an indication that the token commitment is fraudulent, stolen or illegitimate. As such, when an existing token commitment representing an off-chain asset on the ZKP-enabled DLN 100 is nullified (i.e., invalidated so that the existing token commitment no longer represents the off-chain asset on the ZKP-enabled DLN 100) and a new token commitment representing the off-chain asset on the ZKP-enabled DLN 100 is generated by the sender 110a to transfer to recipient 110b as part of a legitimate transaction including the transfer (e.g., sale) of the off-chain asset from the sender 110a to the recipient 110b, in some embodiments, the smart contract may enforce that the counting parameter used to generate the new token commitment remains the same as the counting parameter used to generate the existing (and nullified) token commitment (e.g., by rejecting to include the new token commitment onto the commitments data structure on the ZKP-enabled DLN 100). That is, if an existing token commitment is nullified, the smart contract may enforce that the counting parameter used to generate the new token commitment matches the counting parameter stored on the ZKP-enabled DLN 100 for the existing token commitment.

As a non-limiting example illustration, in some embodiments, the transfer of an off-chain asset identified by an asset token A from the sender 110a to the recipient 110b can be represented on the ZKP-enabled DLN 100 by the generation of the recipient token commitment $Z_r = H(A \circledcirc Pk_r \circledcirc S_r \circledcirc CP_A')$ (and inclusion onto the commitments data structure on the ZKP-enabled DLN 100 if approved by the smart contract) and the nullification of the existing token commitment $Z_s = H(A \circledcirc Pk_s \circledcirc S_s \circledcirc CP_A)$, where A is the asset token identifying the asset (e.g., obtained by hashing, off-chain, at least some identifying parameters of the asset), $Pk_r$ is the public key on the ZKP-enabled DLN 100 that is associated with the recipient 110b, $S_r$ is a random nonce (e.g., generated by the computing node 102a of the sender 110a), $CP_A'$ is a counting parameter for the asset token A (e.g., generated using a pre-determined or pre-approved algorithm of the ZKP-enabled DLN 100 that is configured to be used by all participants of the ZKP-enabled DLN 100 to generate counting parameters when minting token commitments on the ZKP-enabled DLN 100), H is a cryptographic hashing function or algorithm (e.g., SHA-256), and $\circledcirc$ represents a combining operator (e.g., the concatenation operator 1, etc.). Details of the representation, on the ZKP-enabled DLN 100, of the transfer of off-chain assets, including the generation of the recipient token commitment and the nullification of an existing token commitment, are further discussed in Applicant's U.S. Non-Provisional application Ser. No. 16/534,858, filed Aug. 7, 2019, entitled "Methods and Systems for Enhancing Privacy on Distributed Ledger-Based Networks", U.S. Non-Provisional application Ser. No. 16/283,452, filed Feb. 2, 2019, entitled "Methods and Systems for enhancing Privacy and Efficiency on Distributed Ledger-Based Networks," U.S. Non-Provisional application Ser. No. 16/542,701, filed Aug. 16, 2019, entitled "Methods and Systems for Implementing Zero-Knowledge Proofs in Transferring Partitioned Tokens on Distributed Ledger-Based Networks", each of which is incorporated by reference herein in its entirety.

In some embodiments, the sender 110a may provide the recipient token commitment $Z_r$ to the smart contract along with, among other things as discussed in the above-identified patent applications, a ZKP that $CP_A'=CP_A$. In some implementations, the smart contract allows the recipient token commitment $Z_r$ to be added onto the commitments data structure on the ZKP-enabled DLN 100 after verifying the ZKP, which indicates that recipient 110b is the new owner of the asset token A. If the verification of the ZKP fails, on the other hand, in some implementations, the smart contract may reject the recipient token commitment $Z_r$ and prevent the addition or inclusion of $Z_r$ onto the commitments data structure. The verification of the ZKP may fail, for example, if $CP_A'$ does not match $CP_A$ (which may also mean $CP_A'$ may not match the counting parameter (e.g., $CP_A^*$) stored on ZKP-enabled DLN 100 for the token commitment $Z_s$). In some implementations, the smart contract, by verifying the ZKP, may confirm that $CP_A'=CP_A$ without directly comparing the $CP_A'$ of $Z_r$ with the $CP_A$ of $Z_s$. In other words, the use of ZKPs allows the smart contract to confirm $CP_A'=CP_A$ without the smart contract having access to the specific values of $CP_A'$ or $CP_A$. In some implementations, the smart contract may not directly compare either of the values $CP_A'$ or $CP_A$ against the counting parameter $CP_A'$ stored on ZKP-enabled DLN 100, as this may require the values of $CP_A'$ and/or $CP_A$ to be made public, which could leak information relating to the transfer to participants of the ZKP-enabled DLN 100. In some implementations, the recipient of the token commitment $Z_r$ may query the current, publicly-stored value of $CP_A'$ from the ZKP-enabled DLN 100, and compare this against $CP_A'$. In some implementations, equality in this case may mean the received token commitment $Z_r$ is a legitimate representative of the asset token A. The asset token A, however, may be hidden from the smart contract (and from other participants of the ZKP-enabled DLN 100, except the sender 110a and/or the recipient 110b, for example).

Another example of the types of transactions (besides or in addition to asset transfer transactions) where a smart contract may enforce the requirement that the counting parameter used to generate a new token commitment matches the counting parameter used to generate an existing token commitment includes the burning of a token commitment (to represent on the ZKP-enabled DLN 100 the off-chain asset is no longer represented by the token commitment).

As discussed above, in some embodiments, token commitments may be determined to be illegitimate, stolen or fraudulent if the counting parameter used to generate the token commitment fails to match the counting parameter stored on the ZKP-enabled DLN 100 for the asset token which the token commitment represents. In some implementations, the counting parameter stored on the ZKP-enabled DLN 100 counts the number of times a rightful owner of a token commitment has successfully requested for recovery of the token commitment after discovering that the token commitment has been stolen or lost. For example, a participant 110d on the ZKP-enabled DLN 100 (hereinafter referred to as "thief") may obtain the private key of the sender 110a and proceed with transferring the ownership of the token commitment $Z_s=H(A \oplus Pk_t \oplus S_s \oplus CP_A)$ from the sender 110a to himself or herself by nullifying $Z_s$ and generating and submitting to the smart contract a new token commitment $Z_t=H(A \oplus Pk_t \oplus S_t \oplus CP_A)$, where $Pk_t$ is the public key on the ZKP-enabled DLN 100 of the thief 110d and $S_t$ is a random nonce (e.g., generated by the computing node 102d of the thief 110d). In implementations, the smart contract may allow the addition of $Z_t$ into the commitments data structure on the ZKP-enabled DLN 100 after verifying ZKPs required for adding a token commitment onto the commitments data structure (and provided by the thief 110d). As another example, the sender 110a may mistakenly transfer the token commitment $Z_s$ to the thief 110d and the thief 110d may not be willing to return the same. In such instances, the sender 110a may request for recovery of the lost or stolen asset from an arbitrator 110c (e.g., insurer of the lost asset), and if approved by the arbitrator 110c, the stored counting parameter may be increased by one (or in general, may be changed to the next value on the countable set used to obtain the counting parameter), as discussed below with reference to FIG. 3.

Figure 3:
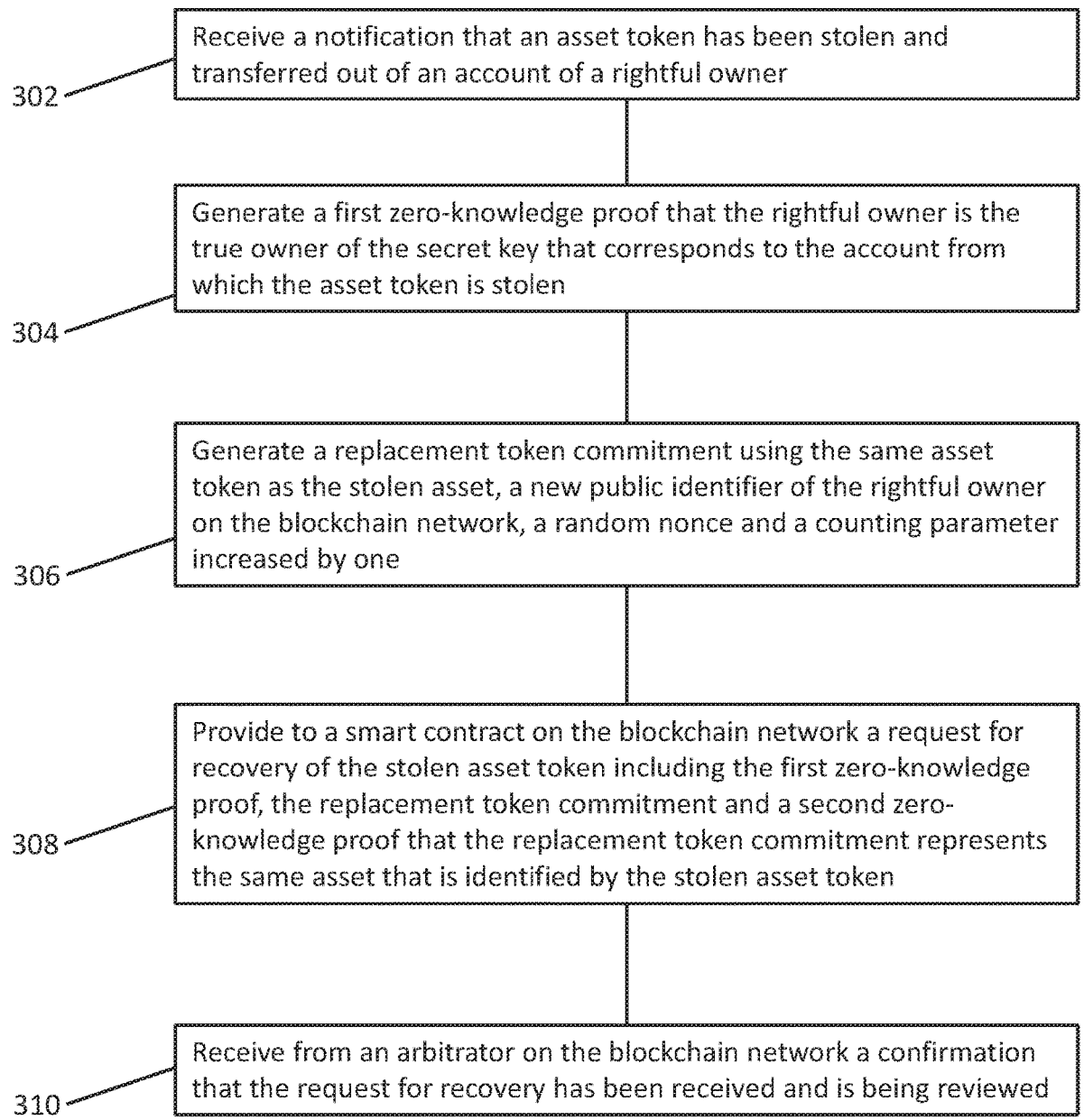
FIG. 3 shows a flow chart illustrating the generation and submission of a request for recovery of token commitments stolen or lost on a distributed ledger-based network, according to some embodiment.

FIG. 3 shows a flow chart illustrating the generation and submission of a request for recovery of token commitments stolen or lost on a distributed ledger-based network, according to some embodiment. In some embodiments, at 302, a rightful owner of a token commitment (e.g., sender 110a) may discover that the token commitment has been lost or stolen, as discussed above, for example. In such embodiments, the rightful owner or sender 110a may wish to request for recovery of the lost or stolen token commitments from the arbitrator 110c (e.g., or multiple arbitrators). In some implementations, to request for recovery, the sender 110a may have to demonstrate to the arbitrator 110c that the sender 110a is the true owner of the private key of the account on the ZKP-enabled DLN 100 from which the token commitment is stolen or lost. That is, at 302, the sender 110a may have to demonstrate that the sender 110a is the true owner of the private key that corresponds to the public key used in generating the lost or stolen token commitment. As such, the sender 110a may have to demonstrate that the (a) the stolen or lost token commitment is generated using the public key of the sender 110a, (b) the public key of the sender 110a is derived or identified using the private key of the sender 110a (e.g., the private key that compromised and used by the thief 110d to steal the token commitment), and (c) the sender 110a is in fact the true owner of this private key. For example, at 304, the sender 110a may have to generate a ZKP that proves, when verified by the smart contract on the ZKP-enabled DLN 100, that 110a i) the sender 110a knows how to derive the private key from a secure master key configured for use on the ZKP-enabled DLN 100 as the master key from which one or more (e.g., all) private keys of a person's accounts on the ZKP-enabled DLN 100 are generated; ii) the public key used to generate the stolen or lost token commitment was derived using the private key; and iii) the stolen or lost token commitment was generated using the public key. Further, the sender 110a may avoid having to publicly reveal the stolen or lost token commitment by generating a ZKP to prove that iv) the stolen or lost token commitment was stored in the commitments data structure on the ZKP-enabled DLN 100. In some implementations, the ZKPs can be used to prove the statements in (i), (ii), (iii) and/or (iv) without having to disclose or reveal publicly the existence and/or identities of the stolen or lost token commitment, the asset token A, the off-chain asset represented on the ZKP-enabled DLN 100 by the stolen or lost token commitment and/or the sender 110a. In some embodiments, the ZKP that the sender 110a has ownership or knowledge of the private key may include other methods in addition to or instead of demonstrating that the private key can be generated from a master key.

In some embodiments, it may not be sufficient for the sender 110a to show or prove possession of the private key (e.g., the compromised private key) to demonstrate that the sender 110a is in fact the rightful owner of the stolen or lost token commitment as, for example, the thief 110d may also be in possession of the same private key. In such instances, one or more master keys for each participant 110a-110e of the ZKP-enabled DLN 100 may be stored in a secure master key database or data structure, the master keys being such that one or more of the private keys of each participant 110a-110e on the ZKP-enabled DLN 100 may be derived from the one or more master keys of that participant 110a-110e via the application of an algorithm (e.g., a pre-determined or pre-approved algorithm that is known or available to the smart contract and/or the off-chain code which facilitates generation of a valid zero-knowledge proof of knowledge of a master key which derives the private key). In some instances, the secure master key database or data structure may be stored off of the ZKP-enabled DLN 100. In some instances, the master key and the private keys of accounts on the ZKP-enabled DLN 100 may be stored in separate databases or data structures. In some implementations, the master keys of the participants 110a-110e may not be stored in the same master key database or data structure. For example, each master key for the participant 110a-110e of the ZKP-enabled DLN 100 may be stored in separate secure master key database or data structures (e.g., to increase the level of security for the master keys).

In some embodiments, to demonstrate that the sender 110a is the true owner of the compromised private key, the sender 110a may generate, using the computing node 102a, a ZKP that the sender 110a knows how to derive the compromised private key by applying the pre-approved or pre-determined algorithm to one of the one or more the sender's 110a master keys. In such embodiments, the use of the ZKP allows the sender 110a to demonstrate that the sender 110a can derive the private key from a master key without having to publicly reveal the master key on the ZKP-enabled DLN 100 (e.g., to the smart contract or the other participants on the ZKP-enabled DLN 100). In some implementations, the pre-approved or pre-determined algorithm can be participant-specific, i.e., the algorithm to derive a particular participant's private keys from that participant's master key(s) may be unique to the participant (e.g., and may be secure, i.e., may not be visible or available to the other participants of the ZKP-enabled DLN 100). In such implementations, the use of the ZKP allows the sender 110a to demonstrate that the sender 110a can derive the private key from a master key without having to publicly reveal the master key and/or the algorithm used to derive the private key on the ZKP-enabled DLN 100. In some implementations, the pre-approved or pre-determined algorithm may be enforced by the ZKP-enabled DLN 100, i.e., the algorithm to derive all participants' private keys from their master key(s) may be the same. In such implementations, the use of the ZKP allows the sender 110a to demonstrate that the sender 110a can derive the private key from a master key without having to publicly reveal the master key used to derive the private key on the ZKP-enabled DLN 100, whilst convincing participants that the derivation was correct because the algorithm is enforced to be the same for all participants. In some implementations, a proof of the ZKP by the smart contract on the ZKP-enabled DLN 100 may be viewed as a convincing demonstration that the sender 110a is in fact the true or rightful owner of the compromised private key, since the thief 110d or anyone else not approved by the sender 110a is not likely to have access to the master key(s) to be able to generate the above-discussed ZKP.

Further, in some embodiments, the sender 110a may also generate, using the computing node 102a, the ZKP that the public key used to generate the stolen or lost token commitment was derived using the compromised private key (e.g., the private key which the sender 110a demonstrated they can derive from a secure master key). For example, the sender 110a can generate, using the computing node 102a, a ZKP that $Pk_s$ may be obtained by hashing the compromised private key, i.e., $Pk_s = H(Sk_s)$, where $Sk_s$ is the compromised private key and $Pk_s$ is the public key used in generating the stolen or lost token commitment $Z_s$ (e.g., $Z_s = H(A \circledast Pk_s \circledast S_s \circledast CP_A)$ as discussed above). In some implementations, the use of the ZKP allows the sender 110a to demonstrate, if the ZKP is verified, that the public key of the sender 110a was derived from the compromised private key without having to publicly reveal the identity of the sender 110a (or the compromised private key).

In addition, in some embodiments, the sender 110a may also generate, using the computing node 102a, a ZKP that the stolen or lost token commitment was generated using the public key. For example, the sender 110a may generate, using the computing node 102a, a ZKP that the stolen or lost token commitment is obtained by applying a cryptographic hashing function on the public key on the ZKP-enabled DLN 100 of the sender 110a (e.g., $Z_s = H(A \circledast Pk_s \circledast S_s \circledast CP_A)$). In some embodiments, the sender 110a may not wish to identify to the smart contract or the other participants of the ZKP-enabled DLN 100 the identity of the stolen or lost token commitment. That is, the sender 110a may wish to demonstrate that the stolen or lost token commitment is generated using the public key of the sender 110a without having to identify publicly the stolen or lost token commitment. In such embodiments, the ZKP may include the ZKP that the stolen or lost token commitment is one of the token commitments stored in the commitments data structure of the ZKP-enabled DLN 100. For example, the ZKP may include the ZKP that the stolen or lost token commitment is a leaf node of a tree structure such as, but not limited to, a Merkle tree that contains token commitments as leaf nodes (e.g., the commitments data structure may be a Merkle tree and token commitments submitted to the smart contract by the participants 110a-110e and approved for addition to the commitments data structure by the smart contract may be stored as leaf nodes of the Merkle tree). Such a ZKP, when verified, may allow the sender 110a to demonstrate that the stolen or lost token commitment is generated using the public key of the sender 110a without having to identify the stolen or lost token commitment to the smart contract or publicly on the ZKP-enabled DLN 100.

In some embodiments, the above-discussed ZKPs are configured to convince the arbitrator 110c, upon verification of the ZKPs, that the sender 110a is in fact the true or rightful owner of the stolen or lost token commitment $Z_s$. As discussed above, the ZKPs may be provided to the smart contract as parts of a request for recovery of the token commitment from the sender 110a to an arbitrator 110c (e.g., insurer of the lost asset, i.e., the off-chain asset identified by the asset token A). In some embodiments, the request for recovery of the token commitment may also include a replacement token commitment to represent, on the ZKP-enabled DLN 100, the same off-chain asset token represented by the stolen or lost token commitment $Z_s$. In such embodiments, the sender 110a may wish for the replacement token commitment to be included in the commitments data structure on the ZKP-enabled DLN 100 as the legitimate token commitment representing the off-chain asset identified by the asset token A, while the stolen or lost token commitment $Z_s$ (and any progeny token commitments resulting from the transferring of $Z_s$ (and hence the ownership of the asset token A) via the generation of a new token commitment on the ZKP-enabled DLN 100 through methods discussed in Applicant's U.S. Non-Provisional application Ser. No. 16/534,858, filed Aug. 7, 2019, entitled "Methods and Systems for Enhancing Privacy on Distributed Ledger-Based Networks", U.S. Non-Provisional application Ser. No. 16/283,452, filed Feb. 2, 2019, entitled "Methods and Systems for enhancing Privacy and Efficiency on Distributed Ledger-Based Networks," U.S. Non-Provisional application Ser. No. 16/542,701, filed Aug. 16, 2019, entitled "Methods and Systems for Implementing Zero-Knowledge Proofs in Transferring Partitioned Tokens on Distributed Ledger-Based Networks") is identified on the ZKP-enabled DLN 100 as an illegitimate or fraudulent token commitment. Accordingly, at 306, in some embodiments, the sender 110a, using the computing node 102a, may generate or mint a replacement token commitment and a ZKP that, among other things, the replacement token commitment is obtained via an application of a hashing function on the same asset token A (e.g., the asset token A used in generating the stolen or lost token commitment). Further, the ZKP may also include the ZKP that the counting parameter used in generating the replacement token commitment is next in the countable set to the value of the $CP_A$ used in generating the lost or stolen token commitment (e.g., incremented from $CP_A$ by a unit of the countable set).

In some embodiments, the replacement token commitment configured to represent, on the ZKP-enabled DLN 100, the asset identified by the same asset token A may be computed as follows: $Z_s' = H(A \circledast Pk_s' \circledast S_s' \circledast CP_A++)$, where, $Pk_s'$ is a new public key on the ZKP-enabled DLN 100 of the sender 110a, $S_s'$ is a random nonce (e.g., generated by the computing node 102a of the sender 110a) and $CP_A++$ is a counting parameter for the asset token A incremented from $CP_A$ (e.g., to indicate that an additional request for recovery has been submitted to the smart contract for the asset identified by the asset token A), H is a cryptographic hashing function or algorithm (e.g., SHA-256), and $\circledast$ represents a combining operator (e.g., the concatenation operator 1, etc.). In some implementations, the sender 110a may obtain $CP_A++$ by first accessing $CP_A$ from the ZKP-enabled DLN 100, as discussed above, and then identifying the next counting parameter in the pre-agreed sequence of counting parameters. In some implementations, the sender 110a may obtain $CP_A++$ by first accessing $CP_A$ from their private database (e.g., and double-check its correctness by calculating $H(A, Pk, S, CP_A)$ again and comparing the resulting value against $Z_s$), and then identifying the next counting parameter in the pre-agreed sequence of counting parameters. In some implementations, $Pk_s'$ can be different than $Pk_s$, the public keys used in generating the stolen or lost token commitment $Z_s$, because the sender 110a may obtain a new public key-private key pair to generate the replacement token commitment $Z_s'$ (e.g., since the private key corresponding to the public key $Pk_s$ was compromised, i.e., accessed by the thief 110d). In some embodiments, the computation of the token commitment $Z_s'$ may include application of the hashing function on additional elements besides or instead of A, $Pk_s'$, $S_s'$ and $CP_A++$. In some embodiments, the token commitment comprises or consists of A, $Pk_s'$, $S_s'$ and $CP_A++$. In some embodiments, the application of the hashing function in computing the replacement token commitment allows for the generation or construction of the replacement token commitment without revealing the identities of the preimages of the hashing function H, i.e., without revealing the identities A, $Pk_s'$, $S_s'$ and $CP_A++$ on the ZKP-enabled DLN 100 (e.g., A, $Pk_s'$, $S_s'$ and $CP_A++$ may be kept secret by the sender 110a).

In some embodiments, if the recovery request is approved by the arbitrator 110c and the replacement token commitment is added into the commitments data structure on the ZKP-enabled DLN 100, the counting parameter for the asset token A stored on the ZKP-enabled DLN 100 may also be incremented to match the counting parameter used to generate the replacement token commitment. That is, the counting parameter for the asset token A stored on ZKP-enabled DLN 100 (e.g., $CP_A*$) may be incremented to match $CP_A++$ since $Z_s'$ is now the newly approved token commitment that represents, on the ZKP-enabled DLN 100, the asset identified by the asset token A. As discussed above, a later mismatch between the counting parameter used in generating a token commitment to represent an asset identified by an asset token and the counting parameter stored on the ZKP-enabled DLN 100 ($CP_A*$) for that asset token can serve as an indication of the illegitimacy of the token commitment. As such, the mismatch between the counting parameter used to generate the stolen or lost token commitment to represent the asset token A, i.e., $CP_A$, and the counting parameter stored on the ZKP-enabled DLN 100 for that same asset token A, i.e., $CP_A*$ which has been incremented to equal $CP_A++$, may serve as an indication, to all participants of the ZKP-enabled DLN 100, that the stolen or lost token commitment is illegitimate.

In some embodiments, as discussed above, the relationship between the asset token A and its counting parameter $CP_A*$ (which is stored on the ZKP-enabled DLN 100) may not be publicly visible or available as that may require the asset token A to be exposed or revealed. The privacy or confidentiality of the asset token A may be protected via the use of a representative of the asset token A that hides, cloaks or obfuscates A on the ZKP-enabled DLN 100, an example of such a representative including a hashed value of A, i.e., $D=H(A)$. In some implementations, the representative D of the asset token A may be linked to the counting parameter $CP_A*$ on the ZKP-enabled DLN 100, so that not all participants of the ZKP-enabled DLN 100 can learn information relating to the asset token A, such as that the asset token A is being represented on the ZKP-enabled DLN 100, or the value of the counting parameter of A. In some implementations, the counting parameter for the asset token A which is stored on the ZKP-enabled DLN 100 ($CP_A*$) may be incremented to match the counting parameter $CP_A++$ of a replacement token commitment representing the asset token A, as discussed above (e.g., after the arbitrator 110c approves the recovery request). In such implementations, an owner of the replacement token commitment (and owners of any progeny token commitments of this replacement token commitment) that wishes to determine the counting parameter used to generate the replacement token commitment may at first determine the representative of the asset token A (e.g., determine D, which may be obtained by hashing A), and then query the value of $CP_A*$ which is associated with D from the ZKP-enabled DLN 100, to obtain $CP_A*$. In some implementations, the relationship between D and $CP_A*$ can be a public mapping, i.e., it can be a mapping that is visible to all participants 110a-110e of the ZKP-enabled DLN 100 (while the asset token A remains private or hidden). That is, all participants 110a-110e of the ZKP-enabled DLN 100 can publicly access the value of $CP_A*$; however, the participants 110a-110e may not be able to identify that the value $CP_A^*$ related to the asset token A unless the participants 110a-110e have access to the asset token A so that the participants 110a-110e can compute D and use a publicly available mapping (on the ZKP-enabled DLN 100) from D to $CP_A^*$, to obtain $CP_A^*$.

As noted above, in some embodiments, for transactions that are different from a request for recovery of a stolen or lost token commitment (e.g., transactions such as transferring and/or burning of a token commitment, etc.), the smart contract on the ZKP-enabled DLN 100 may prevent the addition, to the token commitments data structure, of a new token commitment provided to the smart contract to replace an existing token commitment if the counting parameter used to generate the new token commitment is different from the counting parameter used to generate the existing token commitment. For example, if the sender 110a transfers a token commitment to a recipient, the smart contract may not allow newly generated token commitment, owned by the recipient, to be added into the commitments data structure unless the newly generated token commitment is generated using the same counting parameter as the original token commitment, owned by the sender. In such implementations, if the original token commitment is an illegitimate token commitment (e.g., because its counting parameters fails to match the counting parameter stored on the ZKP-enabled DLN 100 (e.g., $CP_A^*$), then the progeny token commitment (e.g., the newly generated token commitment, owned by the recipient) can also be identified as illegitimate by the recipient since the recipient's token commitment shares the same counting parameter as its parent token commitment. As such, when the sender 110a submits to an arbitrator a recovery request for a stolen or lost token commitment as discussed above and the recovery request is approved, then not only the stolen or lost token commitment but also any progeny token commitments may be identified as illegitimate or stolen.

In some embodiments, at 308, the sender 110a may provide the request for recovery of the stolen or lost token commitment that includes one or more ZKPs to the smart contract on the ZKP-enabled DLN 100. In some implementations, the smart contract may then verify the ZKPs and avail the recovery request to the arbitrator 110c for approval (or denial). In some implementations, the deliberation of the recovery request may be carried out off-chain. For example, the arbitrator may determine whether the recovery request meets the arbitrator's requirements for approval (e.g., the stolen or lost token commitment is in fact stolen or lost, the sender 110a that submitted the request has no culpability, etc.). In some embodiments, at 310, the arbitrator 110c may inform the sender 110a, either on-chain and/or off-chain, of the status of the recovery request. If the request for recovery is rejected by the arbitrator 110c, in some embodiments, the smart contract may prevent the addition of the replacement token commitment onto the commitments data structure on the ZKP-enabled DLN 100. In some embodiments, the recovery request may be approved by the arbitrator 110c and the smart contract may allow the addition of the replacement token commitment onto the commitments data structure and the counting parameter stored on the ZKP-enabled DLN 100 may be adjusted (e.g., incremented) to match the counting parameter used to generate the replacement token structure. For example, if the stolen or lost token commitment is $Z_s = H(A \odot Pk_s \odot S_s \odot CP_A)$, then the counting parameter stored on the ZKP-enabled DLN 100 may be $CP_A^*$. After the arbitrator 110c approves the recovery request that includes a replacement token commitment $Z_s' = H(A \odot Pk_s' \odot S_s' \odot CP_A++)$, however, the stored counting parameter $CP_A^*$ may be adjusted to match $CP_A++$, and since $CP_A^*$ may be visible to all participants 110a-110e of the ZKP-enabled DLN 100, they may consult the value of $CP_A^*$ when determining if a particular token commitment is legitimate or not, as discussed above.

In some embodiments, there can be multiple arbitrators. In some implementations, there can be multiple publicly available counting parameters (e.g., multiple $CP_A^*$ parameters) for each asset token A, each with a publicly available counting parameter $CP_{Ai}^*$ associated with an arbitrator (e.g., denoted i). For example, $CP_A$, can be a mapping from $\{D=H(A), Pk_i\}$ to $CP_{Ai}^*$, where $P_i$ is the public key of the arbitrator i. In such implementations, publicly available counting parameters $CP_{Ai}^*$ that are associated with arbitrators that approve the recover request may be adjusted or incremented, while the publicly available counting parameters $CP_{Ai}^*$ that are associated with arbitrators that do not approve the recovery request may remain the same. The participants 110a-110e of the ZKP-enabled DLN 100 that consult the publicly available counting parameters to determine whether a token commitment may be legitimate or not may have to decide which arbitrator(s) to believe.

In some instances, a time lag can exist between when a request for recovery of a stolen or lost token commitment is submitted on the ZKP-enabled DLN 100 and a decision by an arbitrator or arbitrators is rendered. In such instances, it may be useful to indicate on the ZKP-enabled DLN 100 that there is a pending request for recovery of a stolen or lost token commitment, so that participants 110a-110e of the ZKP-enabled DLN 100 may be on guard against a possibly illegitimate token commitment. In such cases, there can be a pending publicly available counting parameter $PCP_A^*$ that is the same in all respects as $CP_A^*$, except that $PCP_A^*$ is incremented when a request for recovery of a stolen or lost token commitment is submitted on the ZKP-enabled DLN 100 (as opposed to when the request is approved by an arbitrator in the case of $CP_A^*$, for example). If the request is rejected, in some cases, $PCP_A^*$ may be decremented; if the request is approved, the incremented $PCP_A^*$ remains.

In some embodiments, as discussed above, a new owner or recipient of a token commitment $Z_r = H(A \odot Pk_s \odot S_r \odot CP_A)$ configured to represent on the ZKP-enabled DLN 100 an off-chain asset that is identified by the asset token A may access the counting parameter for that asset token A that is stored on the ZKP-enabled DLN 100 to compare $CP_A$ to the stored counting parameter ($CP_A^*$) and determine whether $Z_r$ is a legitimate token commitment. For example, the new owner or recipient may initially calculate $D=H(A)$, and use the publicly available mapping that maps D to the stored counting parameter $CP_A^*$ to arrive at the stored counting parameter $CP_A^*$. In some implementations, $CP_A$ may be different from the stored counting parameter $CP_A^*$ (e.g., the latter has already been incremented because a rightful owner has claimed it as stolen or lost and has submitted a recovery request, and an arbitrator has approved the request for recovery), indicating to the new owner or recipient that the token commitment $Z_r$ is an illegitimate token commitment. In such implementations, the new owner or recipient may use a computing node that is part of the ZKP-enabled DLN 100 to generate and submit a ZKP to a smart contract to report the receipt of an illegitimate token commitment. For example, the ZKP can include the ZKP that (i) the new owner or recipient is in fact an owner of the token commitment $Z_r$; (ii) token commitment $Z_r$ is one of the token commitments stored in the commitments data structure of the ZKP-enabled DLN 100; and/or (iii) an arbitrator has determined that token commitment $Z_r$ is in fact illegitimate.

In some embodiments, the ZKP that new owner or recipient is in fact an owner of token commitment $Z_r$ may include the ZKP that the new owner or recipient is an owner of the private key that allows the transfer of token commitment $Z_r$. For example, the ZKP can prove, when verified by the smart contract on the ZKP-enabled DLN 100, that the owner or recipient is in possession of the private key that corresponds to the public key $Pk_r$ that was used in generating token commitment $Z_r$.

In some embodiments, the ZKP that the token commitment $Z_r$ is one of the token commitments stored in the commitments data structure of the ZKP-enabled DLN 100 may include the ZKP that the token commitment $Z_r$ is a leaf node of a tree structure such as, but not limited to, a Merkle tree that contains token commitments as leaf nodes. For example, the commitments data structure may be a Merkle tree and token commitments submitted to the smart contract by the participants 110a-110e of the ZKP-enabled DLN 100 and approved for addition to the commitments data structure by the smart contract may be stored as leaf nodes of the Merkle tree. In such implementations, the ZKP may include the ZKP that the token commitment $Z_r$ is stored as a leaf node of the Merkle tree.

In some embodiments, the ZKP that an arbitrator has determined that token commitment $Z_r$ is in fact an illegitimate token commitment may include the ZKP that the counting parameter $CP_A$ used in generating $Z_r$ fails to match the counting parameter stored in the counting parameter tracking data structure on ZKP-enabled DLN 100 for that asset token A (e.g., the stored counting parameter has been incremented over or exceeds $CP_A$). Upon receiving and verifying the above-noted ZKPs, in some embodiments, the smart contract may notify the participants of the ZKP-enabled DLN 100 that the token commitment $Z_r$ is in fact an illegitimate token commitment. In some implementations, the use of the ZKPs allows the new owner or recipient to report the illegitimate token commitment without having to identify $Z_r$, A, $Pk_r$, $S_r$ and/or $CP_A$ to the smart contract or publicly on the ZKP-enabled DLN 100.

While various embodiments have been described and illustrated herein, one will readily envision a variety of other means and/or structures for performing the function and/or obtaining the results and/or one or more of the advantages described herein, and each of such variations and/or modifications is deemed to be within the scope of the embodiments described herein. More generally, one will readily appreciate that all parameters, dimensions, materials, and configurations described herein are meant to be exemplary and that the actual parameters, dimensions, materials, and/or configurations will depend upon the specific application or applications for which the teachings is/are used. One will recognize, or be able to ascertain using no more than routine experimentation, many equivalents to the specific embodiments described herein. It is, therefore, to be understood that the foregoing embodiments are presented by way of example only and that, within the scope of the disclosure, including the appended claims and equivalents thereto, disclosed embodiments may be practiced otherwise than as specifically described and claimed. Embodiments of the present disclosure are directed to each individual feature, system, tool, element, component, and/or method described herein. In addition, any combination of two or more such features, systems, articles, elements, components, and/or methods, if such features, systems, articles, elements, components, and/or methods are not mutually inconsistent, is included within the scope of the present disclosure.

The above-described embodiments can be implemented in any of numerous ways. For example, embodiments may be implemented using hardware, software or a combination thereof. When implemented in software, the software code can be stored (e.g., on non-transitory memory) and executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, netbook computer, or a tablet computer. Additionally, a computer may be embedded in a device not generally regarded as a computer but with suitable processing capabilities, including a smart phone, smart device, or any other suitable portable or fixed electronic device.

Also, a computer can have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer can receive input information through speech recognition or in other audible format.

Such computers can be interconnected by one or more networks in any suitable form, including a local area network or a wide area network, such as an enterprise network, and intelligent network (IN) or the Internet. Such networks can be based on any suitable technology and can operate according to any suitable protocol and can include wireless networks, wired networks or fiber optic networks.

The various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but can be distributed in a modular fashion amongst a number of different computers or processors to implement various aspects of the disclosure.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, data structures can be stored in computer-readable media in any suitable form. For simplicity of illustration, data structures may be shown to have fields that are related through location in the data structure. Such relationships can likewise be achieved by assigning storage for the fields with locations in a computer-readable medium that convey relationship between the fields. However, any suitable mechanism can be used to establish a relationship between information in fields of a data structure, including through the use of pointers, tags or other mechanisms that establish relationship between data elements.

Also, various concepts can be embodied as one or more methods, of which an example has been provided. The acts performed as part of the method may be ordered in any suitable way. Accordingly, embodiments can be constructed in which acts are performed in an order different than illustrated, which can include performing some acts simultaneously, even though shown as sequential acts in illustrative embodiments. All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:

receiving, at a computing node of a distributed ledger-based network (DLN) and from a requester compute device of a requester, a request for recovery for a first token commitment representing an asset on the DLN, the first token commitment generated via an application of a first hashing function on an asset token identifying the asset, a first public identifier on the DLN of the requester, a first random nonce and a first counting value, the request for recovery including (1) a second token commitment generated via an application of a second hashing function on the asset token, a second public identifier on the DLN of the requester, a second random nonce and a second counting value, and (2) a zero-knowledge proof (ZKP) that (i) a token commitments data structure on the DLN that contains token commitments approved for addition onto the DLN includes the first token commitment, and/or (ii) the second token commitment is generated via the application of the second hashing function on a group including the asset token used to generate the first token commitment;

verifying the ZKP in response to receiving the request for recovery;

receiving an indication of approval of the request for recovery from an arbitrator compute device of an arbitrator; and adding, via the computing node, the second token commitment onto the token commitments data structure in response to the ZKP being verified and the indication of the approval of the request for recovery being received.

2. The method of claim 1, wherein the first public identifier is a public key of the requester on the DLN, the ZKP further including the ZKP that the requester is capable of deriving a private key used to generate the first public key from a master key.

3. The method of claim 1, wherein the first public identifier is a public key of the requester on the DLN, the ZKP further including the ZKP that the first token commitment is generated via the application of the first hashing function on the group including the public key on the DLN of the requester.

4. The method of claim 1, wherein the first counting value and the second counting value are drawn from a set of counting values, the second counting value obtained by incrementing the first counting value by a unit of the set of counting values.

5. The method of claim 1, further comprising incrementing by one a public record of a number of approved requests for recovery submitted for the asset after the second token commitment is added onto the token commitments data structure.

6. The method of claim 1, further comprising incrementing by one a public record of a number of approved requests for recovery submitted for the asset after the second token commitment is added onto the token commitments data structure, the public record configured to cloak a publicly identifying information of the asset and/or the asset token.

7. The method of claim 1, further comprising incrementing by one a public record of a number of pending requests for recovery submitted for the asset prior to the indication of approval of the request for recovery is received from the arbitrator.

8. The method of claim 1, wherein the arbitrator is included within a plurality of arbitrators, the indication of approval of the request for recovery including a majority vote of the plurality of arbitrators approving the request for recovery.

9. The method of claim 1, wherein the token commitments data structure is a Merkle tree.

10. A non-transitory, processor-readable medium storing instructions that, when executed by a processor, cause the processor to:

receive, from a requester compute device of a requester, a request for recovery for a first token commitment representing an asset on a distributed ledger-based network (DLN), the first token commitment generated via an application of a first hashing function on an asset token identifying the asset, a first public identifier on the DLN of the requester, a first random nonce and a first counting value, the request for recovery including (1) a second token commitment generated via an application of a second hashing function on the asset token, a second public identifier on the DLN of the requester, a second random nonce and a second counting value, and (2) a zero-knowledge proof (ZKP) that (i) a token commitments data structure on the DLN that contains token commitments approved for addition onto the DLN includes the first token commitment, and/or (ii) the second token commitment is generated via the application of the second hashing function on a group including the asset token used to generate the first token commitment;

verify the ZKP in response to receiving the request for recovery;

receive an indication of approval of the request for recovery from an arbitrator compute device of an arbitrator; and add the second token commitment onto the token commitments data structure in response to the ZKP being verified and the indication of the approval of the request for recovery being received.

11. The non-transitory, processor-readable medium of claim 10, wherein the first public identifier is a public key of the requester on the DLN, the ZKP further including the ZKP that the requester is capable of deriving a private key used to generate the public key from a master key.

12. The non-transitory, processor-readable medium of claim 10, wherein the first public identifier is a public key of the requester on the DLN, the ZKP further including the ZKP that the first token commitment is generated via the application of the first hashing function on the group including the public key on the DLN of the requester.

13. The non-transitory, processor-readable medium of claim 10, wherein the first counting value and the second counting value are drawn from a set of counting values, the second counting value obtained by incrementing the first counting value by a unit of the set of countable values.

14. The non-transitory, processor-readable medium of claim 10, further storing instructions that, when executed by the processor, cause the processor to increment by one a public record of a number of approved requests for recovery submitted for the asset after the second token commitment is added onto the token commitments data structure.

15. The non-transitory, processor-readable medium of claim 10, further storing instructions that, when executed by the processor, cause the processor to increment by one a public record of a number of approved requests for recovery submitted for the asset after the second token commitment is added onto the token commitments data structure, the public record configured to cloak a publicly identifying information of the asset and/or the asset token.

16. The non-transitory, processor-readable medium of claim 10, further storing instructions that, when executed by the processor, cause the processor to increment by one a public record of a number of pending requests for recovery submitted for the asset prior to the indication of approval of the request for recovery is received from the arbitrator.

17. The non-transitory, processor-readable medium of claim 10, wherein the arbitrator is included within a plurality of arbitrators, the indication of approval of the request for recovery including a majority vote of the plurality of arbitrators approving the request for recovery.

18. The non-transitory, processor-readable medium of claim 10, wherein the token commitments data structure is a Merkle tree.

19. The non-transitory, processor-readable medium of claim 10, wherein the instructions to verify the ZKP in response to receiving the request for recovery include instructions to verify the ZKP using a self-executing code segment.

20. The non-transitory, processor-readable medium of claim 10, wherein the instructions to verify the ZKP in response to receiving the request for recovery include instructions to verify at least one statement included in the ZKP.

* * * * *

UNITED STATES PATENT AND TRADEMARK OFFICE
CERTIFICATE OF CORRECTION

PATENT NO. : 11,502,838 B2
APPLICATION NO. : 16/848296
DATED : November 15, 2022
INVENTOR(S) : Michael Laurence Connor It is certified that error appears in the above-identified patent and that said Letters Patent is hereby corrected as shown below:

In the Claims

Column 29, Line 11 (Claim 2, Line 4): "deriving a private key used to generate the first public key" should read --deriving a private key used to generate the public key--

Signed and Sealed this
Twenty-eighth Day of February, 2023

Katherine Kelly Vidal
*Director of the United States Patent and Trademark Office*